United States Patent
Akiyama et al.

(10) Patent No.: US 12,541,246 B2
(45) Date of Patent: Feb. 3, 2026

(54) INFORMATION PROCESSING DEVICE AND INFORMATION PROCESSING SYSTEM

(71) Applicant: MAXELL, LTD., Kyoto (JP)

(72) Inventors: Hitoshi Akiyama, Kyoto (JP); Yoshinori Okada, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/837,708

(22) PCT Filed: Feb. 16, 2022

(86) PCT No.: PCT/JP2022/006168
§ 371 (c)(1),
(2) Date: Aug. 12, 2024

(87) PCT Pub. No.: WO2023/157121
PCT Pub. Date: Aug. 24, 2023

(65) Prior Publication Data
US 2025/0138627 A1    May 1, 2025

(51) Int. Cl.
*G06F 3/01* (2006.01)
(52) U.S. Cl.
CPC .............. *G06F 3/011* (2013.01); *G06F 3/017* (2013.01)
(58) Field of Classification Search
CPC .......... G06F 3/011; G06F 3/017; G06F 3/013; G06F 3/014; G06F 3/016; G06F 3/015
See application file for complete search history.

(56) References Cited

U.S. PATENT DOCUMENTS

| | | | |
|---|---|---|---|
| 10,671,176 | B2 | 6/2020 | Baranski et al. |
| 2015/0382388 | A1 | 12/2015 | Legallais et al. |

(Continued)

FOREIGN PATENT DOCUMENTS

| | | |
|---|---|---|
| JP | 2016-009503 A | 1/2016 |
| JP | 2016-085554 A | 5/2016 |
| JP | 2021-009619 A | 1/2021 |

OTHER PUBLICATIONS

International Search Report issued in corresponding International Patent Application No. PCT/JP2022/006168, Apr. 5, 2022, with English translation.

(Continued)

*Primary Examiner* — Adam R. Giesy
(74) *Attorney, Agent, or Firm* — Rimon P.C.

(57) ABSTRACT

An information processing system comprises a first information processing device and a second information processing device. When a predetermined second-linkage start-trigger-motion is detected in the second information processing device within a predetermined period of time after a predetermined first-linkage-start-trigger-motion is detected in the first information processing device, each of the first information processing device and the second information processing device is operated in a linked operation mode, and the linked operation mode is either one of a first linked operation mode for operating the second information processing device in accordance with a motion of a user of the first information processing device detected in the first information processing device, or a second linked operation mode for operating the first information processing device in accordance with a motion of a user of the second information processing device detected in the second information processing device.

14 Claims, 10 Drawing Sheets

(56) References Cited

U.S. PATENT DOCUMENTS

2016/0026425 A1    1/2016  Lee et al.
2016/0034887 A1*  2/2016  Lee .......................... G09G 5/12
                                                          705/39
2016/0309286 A1   10/2016  Son et al.
2018/0033293 A1    2/2018  Ferrin et al.

OTHER PUBLICATIONS

Extended European Search Report dated Nov. 27, 2025, issued in corresponding EP Application No. 22927024.4.

\* cited by examiner

| DETECTED MOTION (161) | WATCH OPERATION CONTENT (162) |
|---|---|
| RAISE HAND AND STOP MOTION | REJECT INCOMING CALL |
| RAISE/LOWER HAND AT NORMAL SPEED | TURN VOLUME UP/DOWN |
| LOWER HAND QUICKLY | MUTE SOUND |
| WAVE HAND | SCROLL TO NEXT PAGE |
| MOVE HAND TOWARD USER | FIND/RING PHONE |
| EXTEND ONLY THUMB AND PINKY FINGER | MAKE PHONE CALL |

| DETECTED MOTION (171) | HMD OPERATION CONTENT (172) |
|---|---|
| RAISE HAND AND STOP MOTION | DISPLAY MENU |
| MOVE HAND UP, DOWN, LEFT, AND RIGHT (AT NORMAL SPEED) | SELECT ITEM IN MENU (MOVE UP, DOWN, LEFT, AND RIGHT) |
| LOWER HAND QUICKLY | CLICK ON SELECTED ITEM |
| MOVE INDEX FINGER UP, DOWN, LEFT, AND RIGHT (AT NORMAL SPEED) | SELECT AR OBJECT (MOVE UP, DOWN, LEFT, AND RIGHT) |
| LOWER INDEX FINGER QUICKLY | CLICK ON SELECTED AR OBJECT |
| MOVE INDEX FINGER AND THUMB TOGETHER UP, DOWN, LEFT, AND RIGHT/ SPREAD OR PINCH INDEX FINGER AND THUMB | MOVE/RESIZE AR OBJECT |

FIG. 6

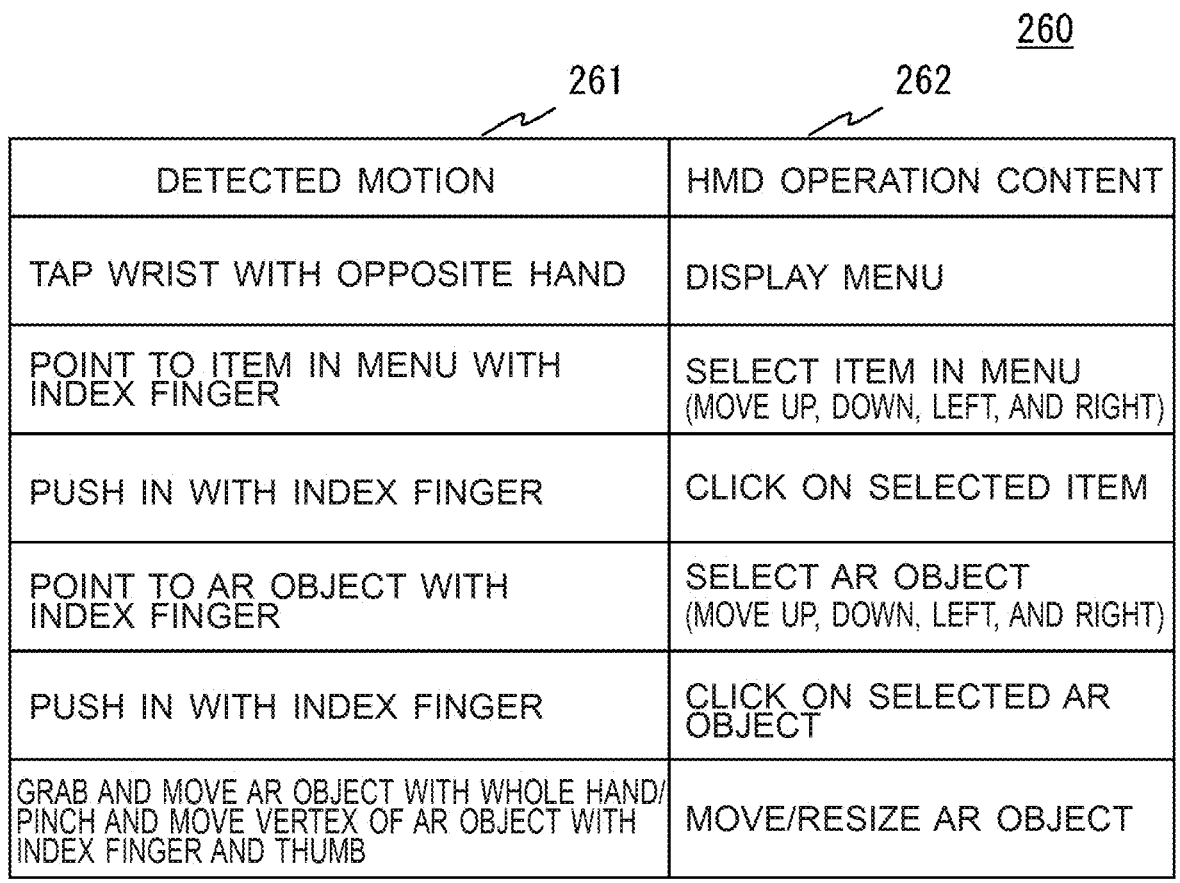

| DETECTED MOTION | HMD OPERATION CONTENT |
|---|---|
| TAP WRIST WITH OPPOSITE HAND | DISPLAY MENU |
| POINT TO ITEM IN MENU WITH INDEX FINGER | SELECT ITEM IN MENU (MOVE UP, DOWN, LEFT, AND RIGHT) |
| PUSH IN WITH INDEX FINGER | CLICK ON SELECTED ITEM |
| POINT TO AR OBJECT WITH INDEX FINGER | SELECT AR OBJECT (MOVE UP, DOWN, LEFT, AND RIGHT) |
| PUSH IN WITH INDEX FINGER | CLICK ON SELECTED AR OBJECT |
| GRAB AND MOVE AR OBJECT WITH WHOLE HAND/ PINCH AND MOVE VERTEX OF AR OBJECT WITH INDEX FINGER AND THUMB | MOVE/RESIZE AR OBJECT | dd # INFORMATION PROCESSING DEVICE AND INFORMATION PROCESSING SYSTEM

CROSS-REFERENCE TO RELATED APPLICATIONS

This application is the U.S. National Phase under 35 U.S.C. § 371 of International Application No. PCT/JP2022/006168, filed on Feb. 16, 2022, and the entire contents of each of which are hereby incorporated by reference.

TECHNICAL FIELD

The present invention relates to a technique of operating one information processing device using a motion of a user performed for another information processing device.

BACKGROUND ART

As an example of an information processing device, a smartwatch that is worn on the wrist and used has been known. A smartwatch is worn on the wrist, and has various functions such as a clock, measurement of activity, and the like. Furthermore, a technique of acquiring myoelectric information to detect a motion (gesture) of a person who is using the smartwatch (user) so as to operate the smartwatch based on the detected gesture has been known (for example, see Patent Literature 1).

Using this technique, a further technique of liking a head-mounted display (hereinafter, referred to as "HMD") with a smartwatch and operating the HMD using a gesture detected by the smartwatch has been developed. An HMD is a type of information processing device having a display function in general, which is worn on the head of a user and provides information on the real space and the virtual space to the user so as to allow him or her to view it. The technique described above does not require the user to make a gesture in front of his or her eyes as in the case of detecting a gesture using a camera of an HMD, and thus can reduce the embarrassment that the user may feel or strangeness that people in the surroundings may feel.

In this conventional technique, it is necessary to switch the operation mode depending on a gesture detected by the smartwatch, between a mode of determining the detected gesture as an operation instruction for the smartwatch and a mode of determining the detected gesture as an operation instruction for the HMD. However, in general, the hand moves constantly, and moreover, there is a limit on the sophistication of myoelectric information. Accordingly, switching the operation mode only using myoelectric information tends to cause frequent misidentification and malfunctions. On the other hand, using the motions, such as touching a screen of the smartwatch, pushing a crown thereof, and the like, to switch the mode can reduce the misidentification and malfunctions. However, this requires the user to use the hand on the opposite side, which impairs the advantages of this conventional technique which has enabled one-hand operation using the myoelectric information.

As an example of determining which of a plurality of information processing devices, such as a smartwatch and an HMD, the operation instruction is for and switching the operation mode, Patent Literature 2 discloses "an information processing device to be worn on a first portion of a user, which includes: a sensor for outputting a first signal in response to a motion of the user; a mode setting unit for setting the information processing device to a first mode that uses the first signal to calculate information relating to the motion and a second mode that processes the first signal as an input signal to a display device to be worn on a second portion of the user; and a transmission unit for transmitting, in the second mode, a second signal generated based on the first signal or the first signal to the display device". That is, Patent Literature 2 discloses a technique of switching the operation mode for which of the information processing device or the display device is to be operated based on a motion performed for the information processing device.

CITATION LIST

Patent Literature

Patent Literature 1: U.S. Pat. No. 10,671,176B
Patent Literature 2: JP-A-2016-85554

SUMMARY OF INVENTION

Technical Problem

In Patent Literature 2, switching of the operation mode for which of the information processing device or the display device is to be operated is performed based on the determination on only a motion performed for the information processing device, and thus the accuracy in the discrimination for switching of the operation mode is limited. Therefore, in the convention technique, it is difficult to reliably switch the operation mode with high accuracy, which may result in frequent misidentification and malfunctions.

The present invention is made to solve the problems described above, and relates to an information processing system including a plurality of information processing devices such as a smartwatch and an HMD, which is capable of switching one information processing device to be operated using a motion performed for another information processing device, and an object thereof is to provide a technique for this information processing system, which is capable of reducing misidentification and malfunctions in switching an information processing device to be operated using a simple operation.

Solution to Problem

The present invention provides an information processing device capable of mutual communication with an external device that is an external information processing device, comprising: a storage configured to store a predetermined linkage start trigger motion; a motion detector configured to detect a motion of a user wearing the information processing device; a motion discriminator configured to discriminate whether the motion detected by the motion detector is the linkage start trigger motion; and a switching controller configured to switch an operation mode of the information processing device, the operation mode including: a linked operation mode for generating an operation command to operate the external device in the information processing device and transmitting the operation command to the external device; and a single operation mode for generating the operation command to operate the information processing device in the information processing device and operating the information processing device in accordance with the operation command as generated, and in the single operation mode, the switching controller switches the operation mode to the linked operation mode when both a determination made by the motion discriminator, in which the motion as detected is the linkage start trigger motion, and a reception of a detection notification from the external device, in which a predetermined external linkage start trigger motion has been detected in the external device is indicated, occur within a predetermined period of time.

Furthermore, the present invention provides an information processing device capable of mutual communication with an external device that is an external information processing device, comprising: a storage configured to store a predetermined linkage start trigger motion; a motion detector configured to detect a motion of a user wearing the information processing device; a motion discriminator configured to discriminate whether the motion detected by the motion detector is the linkage start trigger motion; and a switching controller configured to switch an operation mode of the information processing device, the operation mode including: a linked operation mode for receiving an operation command to operate the information processing device from the external device and operating the information processing device in accordance with the operation command; and a single operation mode for generating the operation command to operate the information processing device in the information processing device and operating the information processing device in accordance with the operation command as generated, and in the single operation mode, the switching controller switches the operation mode to the linked operation mode when both a determination made by the motion discriminator, in which the motion as detected is the linkage start trigger motion, and a reception of a detection notification from the external device, in which a predetermined external linkage start trigger motion has been detected in the external device is indicated, occur within a predetermined period of time.

Still further, the present invention provides an information processing system comprising: a first information processing device; and a second information processing device, the first information processing device and the second information processing device being linked to each other for mutual communication, each of the first information processing device and the second information processing device being operated in a linked operation mode when a predetermined second linkage start trigger motion is detected in the second information processing device within a predetermined period of time after a predetermined first linkage start trigger motion is detected in the first information processing device, and the linked operation mode being either one of a first linked operation mode for operating the second information processing device in accordance with a motion of a user of the first information processing device detected in the first information processing device, or a second linked operation mode for operating the first information processing device in accordance with a motion of a user of the second information processing device detected in the second information processing device.

Advantageous Effects of Invention

Using the technique disclosed in the present invention, in an information processing system including a plurality of information processing devices such as a smartwatch and an HMD, which is capable of switching one information processing device to be operated by a motion made for another information processing device, it is possible to reduce mis-identification and malfunctions in switching an information processing device to be operated using a simple operation. The problems, configurations, and advantageous effects other than those described above will be clarified by explanation of the embodiments below.

BRIEF DESCRIPTION OF DRAWINGS

FIG. 4(a) is a diagram for explaining an example of a watch single operation database according to an embodiment of the present invention, and FIG. 4(b) is a diagram for explaining an example of a linked operation database thereof.

FIG. 6 is a diagram for explaining an example of an HMD single operation database according to an embodiment of the present invention.

DESCRIPTION OF EMBODIMENTS

According to the embodiments of the present invention, combining trigger motions in a plurality of information processing devices enables switching of operation modes with high accuracy. The present technique capable of switching operation modes with high accuracy contributes to "9. Industry, Innovation and Infrastructure" of the Sustainable Development Goals (SDGs) proposed by the United Nations.

Hereinafter, an exemplified embodiment of the present invention will be described with reference to the drawings. An information processing system according to the present embodiment includes an information processing device (first information processing device) and an external device (second information processing device) that is connected in advance to the information processing device to communicate with each other. When predetermined trigger motions are detected in the first information processing device and the second information processing device substantially at the same timing, both the operation modes of the first information processing device and second information processing device are shifted to the linked operation modes. In the linked operation modes, the second information processing device (device to be operated) is operated based on the motion detected in the first information processing device (operation device).

Hereinafter, an example in which a smartwatch corresponds to the first information processing device (operation device) and a head-mounted display corresponds to the second information processing device (device to be operated) will be described.

The smartwatch is an information processing device that is used with being worn on the wrist in the same manner as a wristwatch. Hereinafter, the smartwatch will be referred to as watch. The head-mounted display is an information processing device that is worn on the head of a user and displays information on the real space and virtual space so as to allow the user to view it. Hereinafter, the head-mounted display will be referred to as HMD.

The watch has not only a clock function, but also functions such as calling, reception of messages, and communicating with other devices, and moreover, a function as an activity meter for measuring the activity (momentum) of a user. Furthermore, the watch can acquire myoelectric information using a myoelectric sensor for detecting biopotentials. Using the myoelectric information acquired by the myoelectric sensor when the wrist moves, the watch can detect a hand-moving motion (gesture) of the user wearing the watch.

The HMD has not only the function of displaying real space information and virtual space information, but also can detect a motion, posture state, and line of sights of the user using various sensors provided therein.

Figure 1:
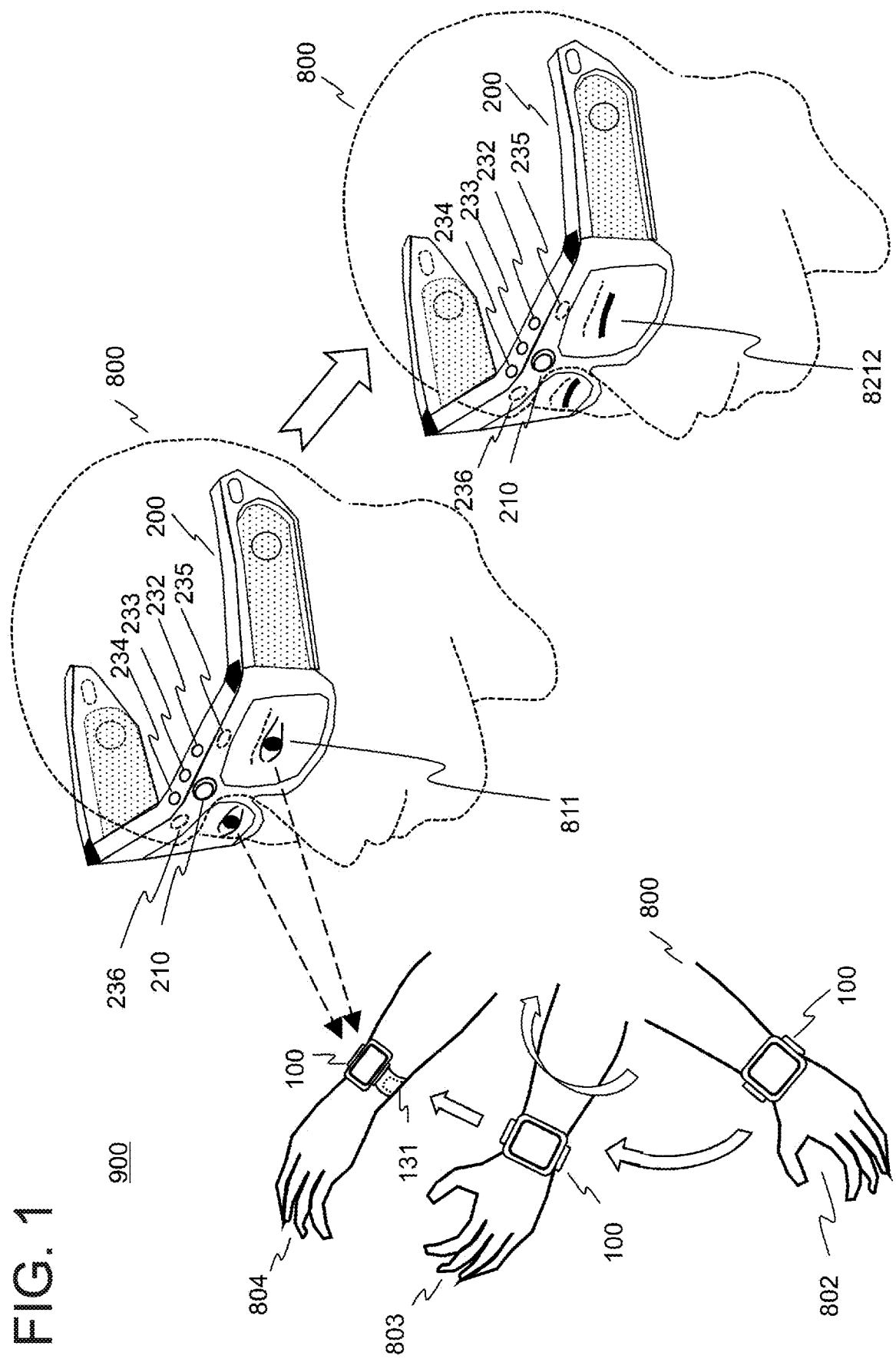
FIG. 1 is a diagram for explaining the outline of an information processing system according to an embodiment of the present invention.

Firstly, an outline of an information processing system 900 according to the present embodiment will be described. FIG. 1 is a diagram for explaining the outline of the information processing system 900 according to the present embodiment.

The information processing device 900 according to the present embodiment includes a watch 100 and an HMD 200. The watch 100 is worn on the wrist of a user 800. The HMD 200 is worn on the head of the user 800. The watch 100 and the HMD 200 are linked to each other in advance for communication therebetween.

The watch 100 includes an electromyographic sensor 131. The HMD 200 includes a left line-of-sight sensor 235 and a right line-of-sight sensor 236, which detect the lines of sight of both the left and right eyes of the user 800, respectively, an acceleration sensor 232 for detecting a posture state and motion of the user 800, a gyro sensor 233, a geomagnetic sensor 234, and a camera 210 for capturing an image of a surrounding environment or the like.

The watch 100 according to the present embodiment includes, as the operation modes, a watch single operation mode and an HMD linked operation mode.

In the watch single operation mode, an operation command for operating the watch 100 is generated in the watch 100, and the watch 100 is operated in accordance with the generated operation command. In other words, in the watch single operation mode, the watch 100 detects a motion of the user 800 or an input instruction, and operates the watch 100 in accordance with the result of detection.

In the HMD linked operation mode, an operation command for operating the HMD 200 is generated in the watch 100, and the generated operation command is transmitted to the HMD 200. In other words, in the HMD linked operation mode, the watch 100 detects a motion of the user 800 or an input instruction, generates an operation command for the HMD 200 in accordance with the result of detection, and transmits the operation command to the HMD 200.

The HMD 200 according to the present embodiment includes, as the operation modes, an HMD single operation mode and a watch linked operation mode. In the HMD single operation mode, the HMD 200 detects a motion of the user 800 or an input instruction, and operates the HMD 200 in accordance with the result of detection. In the watch linked operation mode, the HMD 200 receives the operation command from the watch 100 and operates the HMD 200 in accordance with the operation command.

Figure 2:
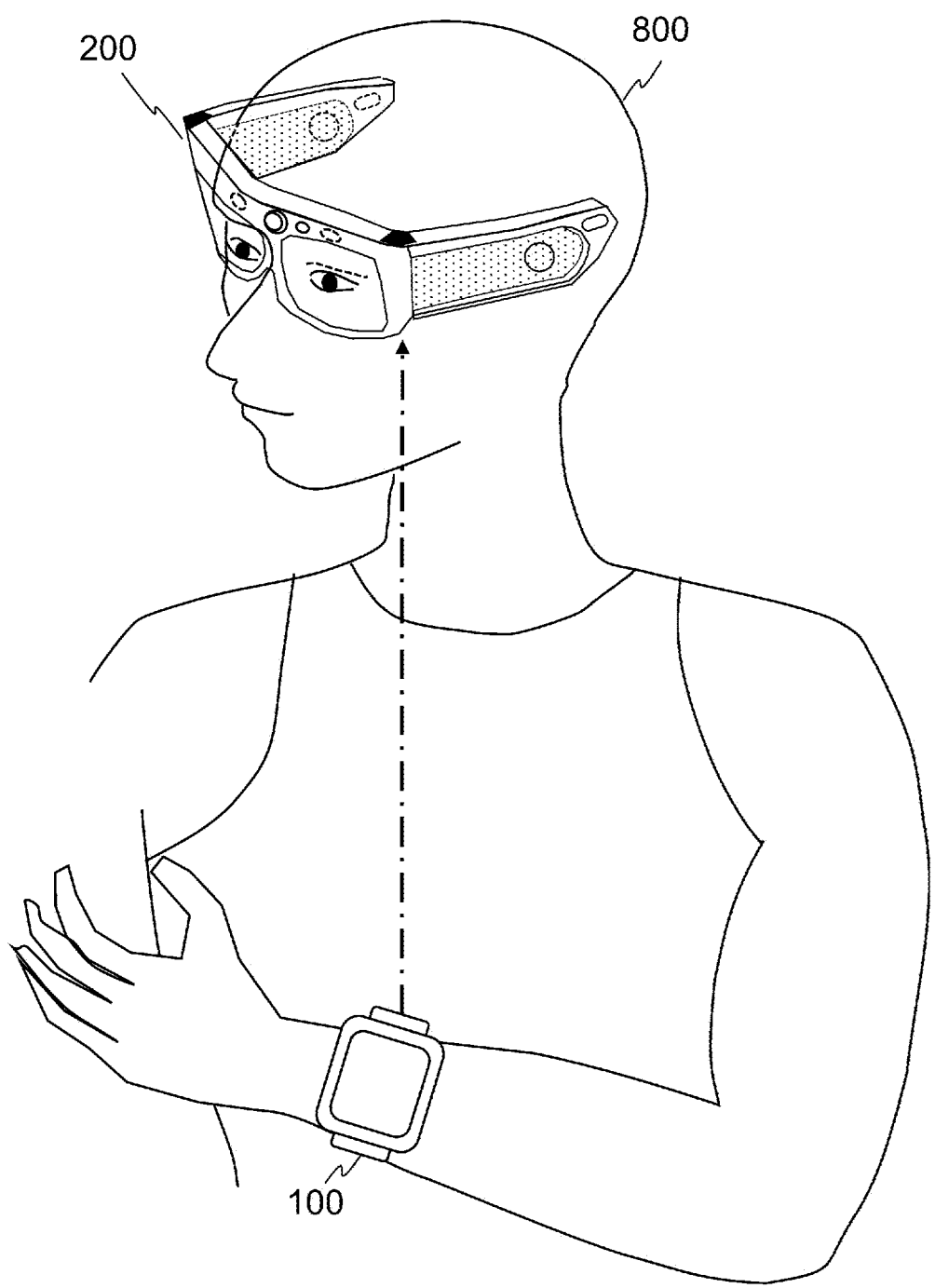
FIG. 2 illustrates an example of a diagram for explaining the outline of an information processing system according to an embodiment of the present invention.

The watch 100 and the HMD 200 work in the watch single operation mode and the HMD single operation mode in their initial states (immediately after being activated), respectively. Then, when the watch 100 detects a predetermined trigger motion and the HMD 200 detects a predetermined trigger motion at the same time or within a predetermined period of time, the operation mode of the watch 100 and that of the HMD 200 are shifted to the HMD linked operation mode and the watch linked operation mode, respectively. In the HMD linked operation mode and the watch linked operation mode, as illustrated in FIG. 2, the watch 100 transmits an operation command corresponding to the motion of the user detected by the watch 100 to the HMD 200 as the operation information for operating the HMD 200.

Hereinafter, the watch single operation mode and the HMD single operation mode are referred to as single operation modes when they do not have to be distinguished from each other. Similarly, the HMD linked operation mode and the watch linked operation mode are referred to as linked operation modes when they do not have to be distinguished from each other.

Still further, a motion and an input instruction made by the user 800 which are to be detected by the watch 100 and the HMD 200 are collectively referred to as motions. Among the motions, a motion that is a trigger for switching the operation mode from the single operation mode to the linked operation mode is referred to as linkage start trigger motion, and a motion that is a trigger for switching the operation mode from the linked operation mode to the single operation mode is referred to as linkage termination trigger motion. The linkage start trigger motion and the linkage termination trigger motion are simply referred to as trigger motions when they do not have to be distinguished from each other.

The linkage start trigger motion for the watch 100 and the linkage start trigger motion for the HMD 200 may be the same or different. Hereinafter, in the present embodiment, an example where they are different from each other will be described. Hereinafter, in the present embodiment, when they have to be distinguished from each other, the linkage start trigger motion for the watch 100 is referred to as watch-side linkage start trigger motion, and the linkage start trigger motion for the HMD 200 is referred to as HMD-side linkage start trigger motion (external linkage start trigger motion). Similarly, the linkage termination trigger motion for the watch 100 and the linkage termination trigger motion for the HMD 200 may be the same or different. Hereinafter, in the present embodiment, an example where they are different from each other (referred to as watch-side linkage termination motion and HMD-side linkage termination motion, respectively) will be described.

FIG. 1 illustrates a motion of the user 800 lifting and twisting the wrist on which the watch 100 is worn as an example of the linkage start trigger motion for the watch 100. This motion is generally performed when the user 800 tries to look at the watch 100. In the watch 100, the myoelectric sensor 131 detects, as the linkage start trigger motion, a series of gesture motions in which a state 802 with the wrist wearing the watch 100 being lowered shifts to a state 803 with the arm being lifted and the wrist being raised, and further to a state 804 with the wrist being twisted.

Furthermore, FIG. 1 illustrates a motion of the user 800 closing the eyes for a moment as an example of the linkage start trigger motion for the HMD 200. In the HMD 200, the left line-of-sight sensor 235 and the right line-of-sight sensor 236 capture the moment in which a state 811 with both the eyes of the user 800 being open has shifted to a state 812 with both the eyes being closed, detect it as the linkage start trigger motion. Note that the linkage start trigger motions are not limited to these motions. For example, as described above, the motion of lifting and twisting the wrist on which the watch 100 is worn, which is the same as the linkage start trigger motion for the watch 100, may be used as the linkage start trigger motion for the HMD 200.

As the linkage termination trigger motion for the watch 100, for example, a motion of the hand on which the watch 100 is not worn is used. Specifically, the linkage termination trigger motion for the watch 100 includes the motions of touching the screen of the watch 100, pushing the crown of the watch, and the like. This is because cancelling the linkage (providing a linkage termination instruction) using a motion of the arm on which the watch 100 is worn increases the misidentification of the linkage termination trigger motion for the watch 100 as a motion for operating the HMD 200.

On the other hand, as the linkage termination trigger motion for the HMD 200, for example, a motion of the hand on which the watch 100 is not worn or a motion of a portion other than the hand is used. Specifically, the linkage termination trigger motion for the HMD 200 includes the motion of gazing at the screen of the watch 100, touching a part of the sensor 130 of the HMD 200 with the hand not wearing the watch 100, performing a gesture that is not generally performed (such as covering one eye) with the hand not wearing the watch 100, and the like. Using these motions enables avoidance of erroneous detection in the watch 100 in the same manner as the case described above.

Furthermore, the linkage termination trigger motion may include a motion of the user 800 in which he or she who has been looking in a different direction starts looking at the watch 100 again. In this case, in the HMD 200, the motion in which the user 800 starts looking back at the watch 100 again is detected based on the detection of his or her lines of sight. This is because the intention of the user 800 to restore the operation mode to the watch single operation mode in order to cause the watch 100 to carry out some operations is expected to be reflected in the motion in which the user 800 is looking at the watch 100. Using such a motion as a linkage termination trigger motion, the processing in which the intention of a user is easily reflected can be realized. However, the linkage termination trigger motions are not limited thereto as well.

Next, the watch 100 and the HMD 200 for implementing the functions described above according to the present embodiment will be described.

Watch

Hardware Configuration

Figure 3A:
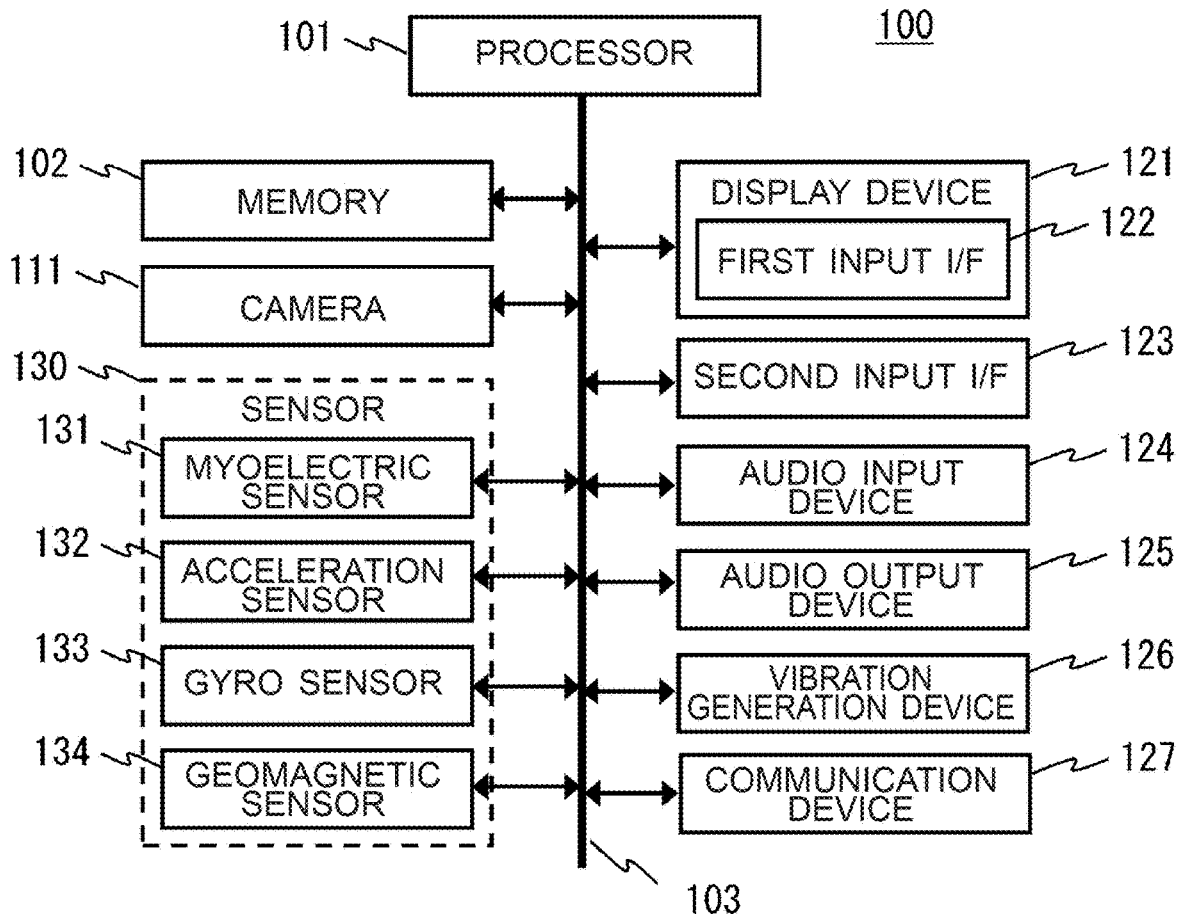
FIG. 3(a) is a hardware configuration diagram of a first information processing device (watch) according to an embodiment of the present invention.

A hardware configuration of the watch 100 according to the present embodiment is illustrated in FIG. 3(a). Among the features illustrated in FIG. 3(a), the ones illustrated in FIG. 1 and FIG. 2 and provided with the same reference signs work in the same manner as those already described in FIG. 1 and FIG. 2, and thus the detailed explanations therefor will be partially omitted.

As illustrated in FIG. 3(a), the watch 100 according to the present embodiment includes a processor 101, a memory 102, a camera 111, a sensor 130, a display device 121, a second input interface (I/F) 123, an audio input device 124, an audio output device 125, a vibration generation device 126, and a communication device 127.

The sensor 130 includes a myoelectric sensor 131, an acceleration sensor 132, a gyro sensor 133, and a geomagnetic sensor 134. The display device 121 includes a first input I/F 122.

These features are connected to each other via a bus 103.

The myoelectric sensor 131 is installed on the housing of the watch 100, the back side of the wristband, or other portions, and detects a biopotential flowing near the wrist at a contact portion of the surface of the wrist. The myoelectric sensor 131 captures a gesture motion of the wrist based on the myoelectric information obtained by detecting a biopotential that flows when the wrist performs a specific motion. Specifically, the myoelectric sensor 131 is a sensor for capturing and processing nerve pulse signals (biological signal) flowing through motor nerves that move the muscles of the hand, such as the radial nerve, the median nerve, and the ulnar nerve passing through the wrist. The myoelectric sensor 131 captures nerve pulse signals flowing through the motor nerves when the hand is moved using two side-by-side sensors. For example, when a gesture action using a thumb is performed, a biological signal for moving the thumb flows from the brain to the radial nerve and also to the median nerve depending on the direction in which the thumb was moved, and the myoelectric sensor 131 detects the gesture action in which the thumb has been moved by capturing the biomechanical signal.

The acceleration sensor 132 is a sensor for detecting an acceleration, which is the change in speed per unit time, and capturing a motion, a vibration, an impact, and the like. When the applied acceleration is only gravity, the acceleration sensor 132 obtains a tilting angle using the gravity vector and its projection on the axis of the acceleration sensor 132, and measures and detects how much it is tilted with respect to the ground.

The gyro sensor 133 is a sensor for detecting the angular velocity in the rotation direction. The gyro sensor 133 captures a state of the posture in the vertical, horizontal, and oblique directions to measure and detect how much and in which direction it has moved.

Using the acceleration sensor 132 and the gyro sensor 133 enables detection of the posture of the watch 100, such as how much it is tilted and in which direction it is facing.

The geomagnetic sensor 134 is a sensor for detecting the magnetic force of the earth, and detects the direction in which the watch 100 is facing. Using the geomagnetic sensor 134 of a three-axis type capable of detecting the geomagnetism in the vertical direction in addition to the front and rear direction and the left and right direction to capture the change in the geomagnetism with respect to the motion of the watch 100 enables detection of the motion of the watch 100.

Using the acceleration sensor 132, the gyro sensor 133, and the geomagnetic sensor 134 enables detection of a state of the posture of the user 800 wearing the watch 100 and a motion thereof. For example, these sensors may be used in place of the myoelectric sensor 131 in the motion detection processing which will be described later. They may be used in combination with the myoelectric sensor 131 for the motion detection. Using them in combination enables motion detection with higher accuracy.

The camera 111 is used to capture images of the surroundings and recognize a motion of the user 800. For example, a motion of looking at the watch 100, which was described as a trigger motion referring to FIG. 1, can be recognized and identified based on an image captured by the camera 111.

The processor 101 is configured with a CPU (Central Processing Unit) and the like, and executes the programs of an operating system (OS) and operation control application stored in the memory 102 to implement the respective functions of the watch 100. The functions to be implemented will be described later.

The memory 102 is configured with a nonvolatile storage device or the like, and functions as a storage section that stores various programs and data to be processed by the processor 101 or the like. The stored data includes the data to be used by the watch 100 for processing, data generated in the middle of processing, and the like. Specifically, the data includes the motion data detected by the watch 100, various types of predetermined trigger motion data, start trigger information to be transmitted to the HMD 200 when a trigger motion is detected, operation commands, operation commands for the HMD 200, and the like.

The display device 121 displays the time, application images, notification information to the user 800, and the like. The notification information to the user 800 includes information indicating that a trigger motion has been detected, information indicating the start or end of the tapping measurement using a finger performed on the display device 121, measurement of change in the head and neck state, information indicating that a switching request has been received, information indicating the start or end of the smartwatch operation, and the like.

The first input I/F 122 accepts an input of information from the user 800 to the watch 100. The first input I/F 122 is provided on the display surface of the display device 121, and detects a touch operation using a finger, touch pen, or the like, to accept the input.

The second input I/F 123 is a crown, a switch, or the like provided at a portion, for example, on the side of the watch 100. The user 800 operates the crown or the switch to input information to the watch 100.

The audio input device 124 collects the voices of the user 800 using a microphone and converts them into audio data. Taking instruction information based on the voices from the user 800 into the watch 100 allows an operation corresponding to the instruction information to be easily executed. For example, the audio input device 124 may collect the voices of the user 800 which indicate an input operation to take in the input information.

The audio output device 125 outputs the audio from a speaker based on the audio data, which allows the user 800 to be notified of the information by means of audio.

The vibration generation device 126 generates a vibration under the control of the processor 101. For example, the processor 101 converts the notification information to the user 800 into vibrations and causes the vibration generation device 126 to transmit them to the wrist on which the watch 100 is worn to notify the user 800 of the notification information. This enables improvement in usability.

The communication device 127 is a communication interface for wireless communication with the HMD 200 using near field wireless communication or the like. The communication device 127 includes communication processing circuitry, an antenna, and the like for various predetermined communication interfaces, and transmits and receives various kinds of information, control signals, and the like. The communication device 127 may include a telephone communication network.

Functional Configuration

Figure 3B:
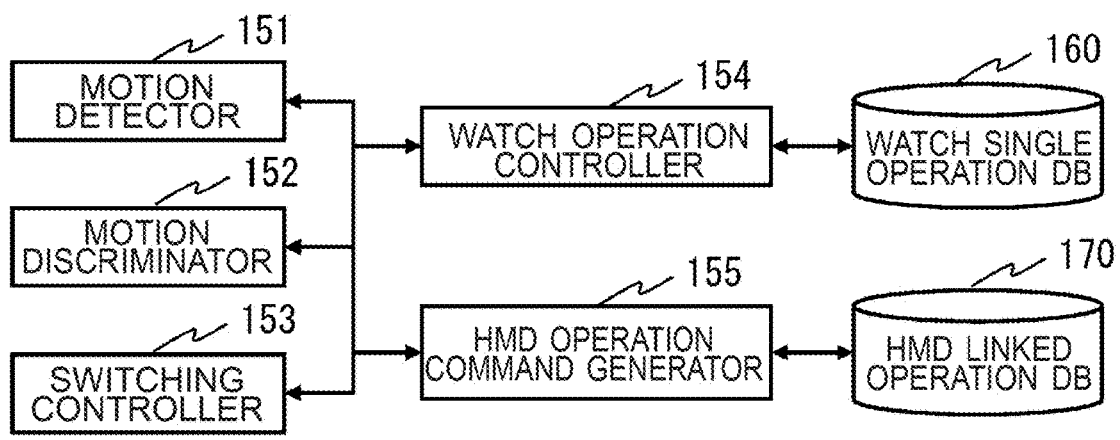
FIG. 3(b) is a functional block diagram thereof.

Next, the functions implemented by the watch 100 according to the present embodiment will be described. FIG. 3(b) is a functional block diagram of the watch 100.

The watch 100 according to the present embodiment includes a motion detector 151, a motion discriminator 152, a switching controller 153, a watch operation controller 154, an HMD operation command generator 155, a watch single operation database (DB) 160, and an HMD linked operation DB 170.

The motion detector 151 detects a motion of the user 800 using the sensor 130 such as the myoelectric sensor 131. As described above, the motion of the user 800 to be detected also includes an operation instruction that is input through the first input I/F 122, the second input I/F 123, and the audio input device 124. The motion detector 151 outputs the motion as detected (hereinafter, referred to as "detected motion") to the motion discriminator 152, and the watch operation controller 154 or the HMD operation command generator 155. As will be described later, when the operation mode is the watch single operation mode, the motion detector 151 outputs the detected motion to the motion discriminator 152 and the watch operation controller 154, and when the operation mode is the HMD linked operation mode, the motion detector 151 outputs the detected motion to the motion discriminator 152 and the HMD operation command generator 155.

The motion discriminator 152 discriminates whether the detected motion matches a predetermined trigger motion (linkage start trigger motion or linkage termination trigger motion). The trigger motions are stored in the memory 102 in advance.

When determining that the detected motion matches a trigger motion, the motion discriminator 152 outputs a watch-side trigger motion detection instruction to the switching controller 153. On the other hand, when the detected motion does not match any trigger motion, the motion discriminator 152 outputs a mismatch signal to the motion detector 151. If receiving the mismatch signal, as described above, the motion detector 151 outputs the detected motion to the watch operation controller 154 or the HMD operation command generator 155 depending on the operation mode.

The switching controller 153 switches the operation mode. In the present embodiment, the switching controller 153 switches the operation mode to the linked operation mode in the watch single operation mode when receiving, from the HMD 200, a detection notification indicating that the HMD-side linkage start trigger motion is detected in the HMD 200 within a predetermined period of time after the motion discriminator 152 determines the motion detected by the motion detector 151 as the watch-side linkage start trigger motion.

The watch 100 may detect the linkage start trigger motion first, or the HMD 200 may detect the linkage start trigger motion first. Hereinafter, in the present embodiment, an example where, after the watch 100 detects the linkage start trigger motion, the HMD 200 also detects the linkage start trigger motion will be described. That is, in the example to be described below, when a linkage start trigger motion is detected in the watch 100 first and then a linkage start trigger motion is detected in the HMD 200 within a predetermined period of time thereafter, the operation command for the HMD 200 is generated in accordance with the motion detected in the watch 100 so that the HMD 200 can be operated by the watch 100.

In this case, when the linkage start trigger motion is detected, the switching controller 153 transmits start trigger information indicating that the linkage start trigger motion has been detected to the HMD 200, and upon receiving a switching request from the HMD 200 within a predetermined period of time after transmitting the start trigger information, switches the operation mode to the HMD linked operation mode. The switching controller 153 discriminates whether the linkage start trigger motion has been detected depending on whether it has received a trigger motion detection instruction from the motion discriminator 152. Furthermore, the switching controller 153 outputs, to the motion detector 151, the operation mode after being switched.

Furthermore, the switching controller 153 switches the operation mode from the HMD linked operation mode to the watch single operation mode when the linkage termination trigger motion is detected in the HMD linked operation mode. At this time, the switching controller 153 transmits the termination trigger information indicating that the linkage termination trigger motion has been detected to the HMD 200. Furthermore, when the watch 100 receives the termination trigger information from the HMD 200 in the HMD linked operation mode, the switching controller 153 switches the operation mode from the HMD linked operation mode to the watch single operation mode.

In the watch single operation mode, the watch operation controller 154 controls the operations of the watch 100 in accordance with the detected motion. In the present embodiment, the watch operation controller 154 generates a command for operating the watch 100 which corresponds to the operation content (watch operation command; own device operation command) referring to the watch single operation DB 160 in which the operation contents of the watch 100 are stored in association with the detected motions, and outputs it to the relating functions.

The HMD operation command generator (external operation command generator) 155 generates a command for operating the HMD 200 in accordance with the detected motion (HMD operation command; external operation command), and outputs it to the HMD 200. In the present embodiment, the HMD operation command generator 155 transmits it to the HMD 200 through the communication device 127. The HMD operation command generator 155 generates an HMD operation command which corresponds to the operation content, referring to the HMD linkage operation DB 170 in which the operation contents of the HMD 200 are stored in association with the detected motions.

In the following, the watch single operation DB 160 and the HMD linked operation DB 170 will be described. FIG. 4(a) is a diagram for explaining an example of the watch single operation DB 160 according to the present embodiment, and FIG. 4(b) is a diagram for explaining an example of the HMD linked operation DB 170.

As illustrated in FIG. 4(a), in the watch single operation DB 160, watch operation contents 162 are registered in association with detected motions 161, respectively. For example, in the watch 100, when a motion of "raising the hand and stopping the motion" is detected by the myoelectric sensor 131, an operation of "rejecting an incoming call" is carried out in the watch 100. Instead of the watch operation contents 162, the watch operation commands themselves for realizing the corresponding operations may be registered.

As illustrated in FIG. 4(b), in the HMD linked operation DB 170, HMD operation contents 172 are registered in association with detected motions 171, respectively. For example, in the watch 100, when a motion of "raising the hand and stopping the motion" is detected by the myoelectric sensor 131, an operation of "displaying a menu" is carried out in the HMD 200. Instead of the HMD operation contents 172, the HMD operation commands themselves for realizing the corresponding operations may be registered.

HMD

Hardware Configuration

Figure 5A:
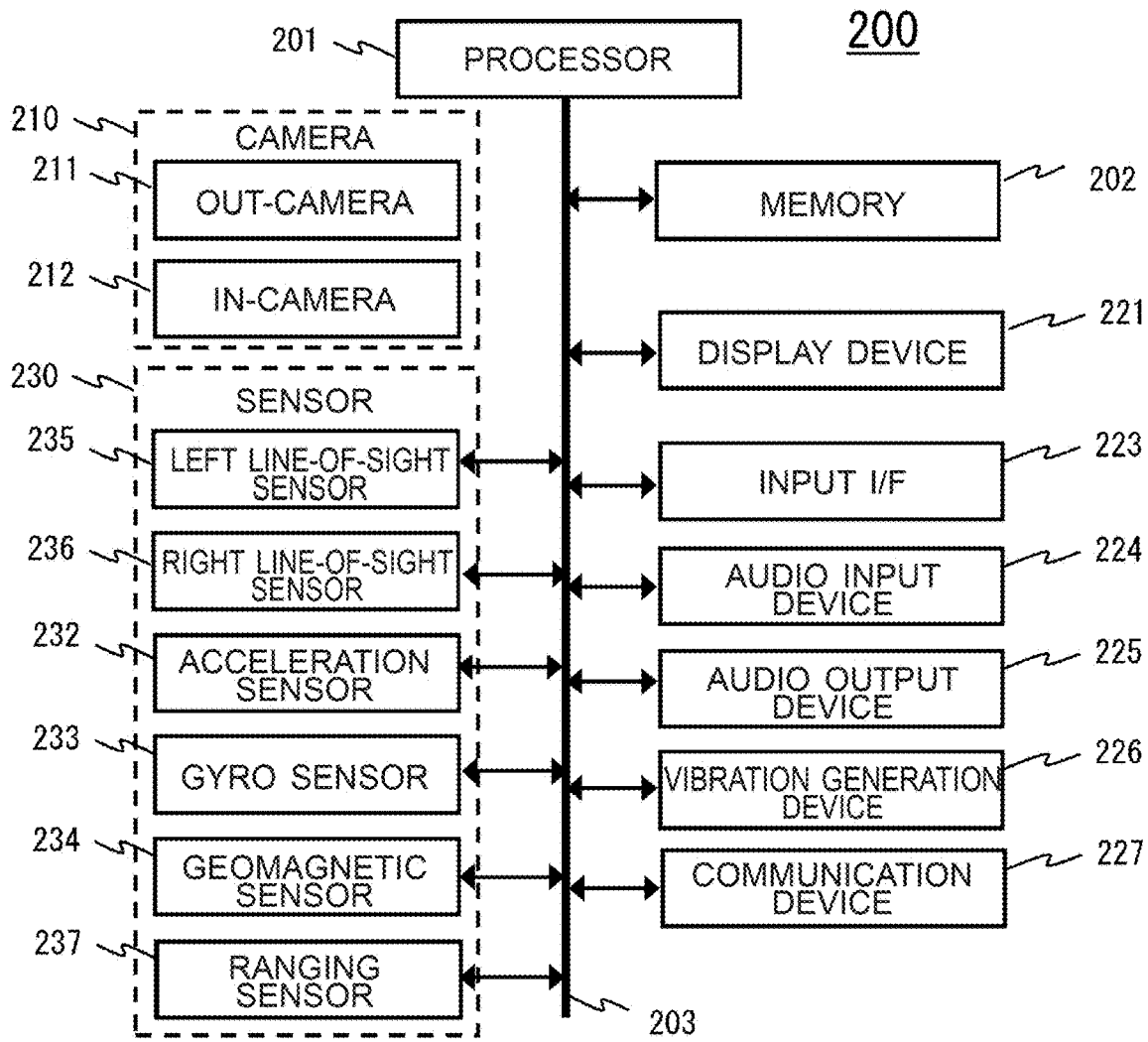
FIG. 5(a) is a hardware configuration diagram of a second information processing device (HMD) according to an embodiment of the present invention.

Next, the configuration of the HMD 200 according to the present embodiment will be described. FIG. 5(a) is a hardware configuration diagram of the HMD 200 according to the present embodiment. Among the features illustrated in FIG. 5(a), the ones illustrated in FIG. 1 and FIG. 2 and provided with the same reference signs work in the same manner as those already described in FIG. 1 and FIG. 2, and thus the detailed explanations therefor will be partially omitted.

As illustrated in FIG. 5(a), the HMD 200 according to the present embodiment includes a processor 201, a memory 202, a camera 210, a sensor 230, a display device 221, an input I/F 223, an audio input device 224, an audio output device 225, a vibration generation device 226, and a communication device 227.

The camera 210 includes an out-camera 211 and an in-camera 212. The sensor 230 includes the acceleration sensor 232, the gyro sensor 233, the geomagnetic sensor 234, the left line-of-sight sensor 235, the right line-of-sight sensor 236, and a ranging sensor 237.

These features are connected to each other via a bus 203.

The out-camera 211 and the in-camera 212 capture images of the front of the HMD 200 and the user 800, respectively.

The out-camera 211 further captures images of the wrist of the user 800 and the watch 100. This enables the out-camera 211 to capture an image of a gesture of the user 800 and thus a trigger motion of the watch 100 to be detected.

The in-camera 212 captures images of the eyes of the user 800 and the peripheral portions thereof as subjects so that change in the state of the motions of the eyeballs and the pupils are measured and detected. For example, the in-camera 212 can detect a motion in which the eyes are closed for a moment or the like as a trigger motion. As a method of measuring and detecting motions of the eyeballs, a method of capturing the eye with a visible light camera and detecting a line of sight based on the position of the iris with respect to the eye head using a reference point as the eye head and a moving point as the iris has been known. This corresponds to the case where an image of the eye of the user 800 is captured by the in-camera 212 so that the motions of the eyeballs and the pupils are measured and detected based on the captured images.

The left line-of-sight sensor 235 and the right line-of-sight sensor 236 are sensors for detecting the motions and the directions of the left eye and the right eye, respectively, and capturing the eye movement and the line of sight. As the processing of detecting the motions of the eyeballs, a well-known technique commonly used as the eye tracking processing may be used. For example, as a technique using corneal reflection, there is known the technique of irradiating a face with infrared LED (Light Emitting Diode), capturing an image with an infrared camera, using a position on the cornea (corneal reflection) on which the reflected light generated by infrared LED irradiation is located as a reference point, and detecting the motion of the eyeball and the line of sight based on the position of the pupil with respect to the position of the corneal reflection.

The acceleration sensor 232 is a sensor for detecting an acceleration, which is the change in speed per unit time, and capturing a motion, a vibration, an impact, and the like. When the applied acceleration is only gravity, the acceleration sensor 132 obtains a tilting angle using the gravity vector and its projection on the axis of the acceleration sensor 232, and measures and detects how much it is tilted with respect to the ground. Thus, how much the HMD 200 is tilted can be detected by the acceleration sensor 232 provided in the HMD 200.

The gyro sensor 233 is a sensor for detecting the angular velocity in the rotation direction. The gyro sensor 233 captures a state of the posture in the vertical, horizontal, and oblique directions to measure and detect how much and in which direction it has moved.

Using the acceleration sensor 232 and the gyro sensor 233 enables detection of the posture of the HMD 200, such as how much it is tilted and in which direction it is facing.

The geomagnetic sensor 234 is a sensor for detecting the magnetic force of the earth, and detects the direction in which the HMD 200 is facing. Using the geomagnetic sensor 234 of a three-axis type capable of detecting the geomagnetism in the vertical direction in addition to the front and rear direction and the left and right direction to capture the change in the geomagnetism with respect to the motion of the HMD 200 enables detection of the motion of the HMD 200.

Using the acceleration sensor 232, the gyro sensor 233, and the geomagnetic sensor 234 enables detection of a state of the posture of the user 800 wearing the HMD 200. This enables, for example, detection of the change in the state of the user 800 to the state in which he or she has directed the lines of sight in the direction of the watch 100 from the state in which he or she was facing in a different direction.

The ranging sensor 237 is a sensor of measuring a distance to an object or an angle so that the shape of a target, such as an object, can be captured three-dimensionally. As the ranging sensor 237, a LiDAR (Light Detection and Ranging) sensor, a TOF (Time Of Flight) sensor, a millimeter-wave radar sensor, and the like are used. A LiDAR sensor irradiates a target with a laser beam such as an infrared ray, measures a reflected scattered light, and analyzes and detects the distance to the target at a long distance and the state of the subject. A TOF sensor measures, for each pixel, the reflection time of the pulsed light emitted to the target for measurement of distance. A millimeter-wave sensor emits a millimeter-wave radio wave, captures the reflected wave, and detects the distance to the target being reflected and the state of the subject.

The ranging sensor 237 measures distances to the index finger, the thumb, and the like, and an angle thereof so that, for example, whether the hand is clenched or opened based on the information obtained by the measurement can be captured. Thus, a motion of the watch 100 such as a trigger can be detected by the ranging sensor 237.

The processor 201 is configured with a CPU and the like, and executes the programs of an OS and an operation control application stored in the memory 202 to implement the respective functions of the HMD 200. The functions to be implemented will be described later.

The memory 202 is configured with a nonvolatile storage device or the like, and functions as a storage section that stores various programs and data to be processed by the processor 201 or the like. The stored data includes the data to be used by the HMD 200 for processing, data generated in the middle of processing, and the like. Specifically, the data includes the motion data detected by the HMD 200, various types of predetermined trigger motion data, operation commands for HMD, switching requests to be transmitted to the watch 100, and the like.

The display device 221 displays various types of information.

In the case where the HMD 200 is the optical see-through type, the display device 221 includes a projection portion and a transparent half-mirror. On the projection portion, for example, an operation guide screen image for finger tap distance measurement, a virtual object such as an image for relaxing the user 800, notification information to the user 800, and the like are projected. On the half mirror, the projected virtual object or the like is imaged and displayed in front of the eyes. This enables the user 800 to view, together with a real object in the field of view in front of the eyes, the imaged virtual object in such a manner that as if it was floating.

In the case where the HMD 200 is the video-through type, the display device 221 includes a display such as a liquid crystal panel. On this display, a real object in front of the eyes captured by the out-camera 211, a virtual object, and the like are displayed together. This enables the user 800 to view the real object in the field of view image in front of the eyes and the virtual object in such a manner that they are superimposed with each other.

The input I/F 223 is an input means such as a key button, a touch key, or the like, and accepts setting input of information to be input by the user 800. In the HMD 200, the input I/F 223 is provided on a position and in a form which allow the user 800 to easily perform an input operation. The input I/F 223 may be separated from the main body of the HMD 200 and connected thereto by wire or wirelessly. An input operation window may be displayed on a display screen of the display device 221. In this case, the input operation information may be captured based on the position on the input operation screen in which the line of sight is directed, or the input operation information may be captured based on an operation by a pointer displayed on the input operation screen window and operated by the input I/F 223.

The audio input device 224 collects the audio from the surroundings and the voices of the user 800 using a microphone and converts them into audio data. Taking instruction information based on the voices from the user 800 into the HMD 200 allows an operation corresponding to the instruction information to be easily executed. For example, the audio input device 224 may collect the voices of the user 800 which indicate an input operation to take in the input information.

The audio output device 225 outputs the audio from a speaker based on the audio data, which allows the user 800 to be notified of the information by means of audio.

The vibration generation device 226 generates a vibration under the control of the processor 201. For example, the processor 201 converts the notification instruction information to the user 800 into vibrations and causes the vibration generation device 226 to transmit them to the head on which the HMD 200 is worn to notify the user 800 of the notification information. This enables improvement in usability.

The communication device 227 is a communication interface for wireless communication with the watch 100 using near field wireless communication or the like. The communication device 227 includes communication processing circuitry, an antenna, and the like for various predetermined communication interfaces, and transmits and receives various kinds of information, control signals, and the like. The communication device 227 may include a telephone communication network.

Function Configuration

Figure 5B:
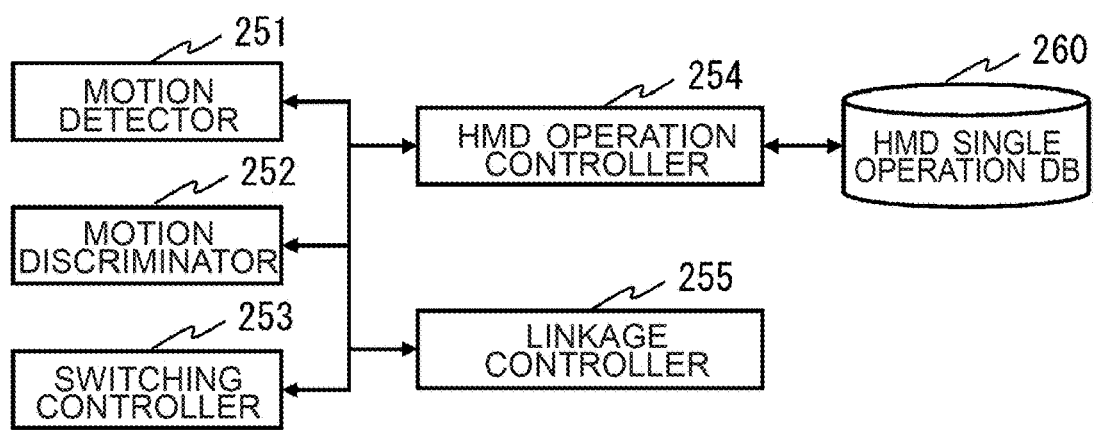
FIG. 5(b) is a functional block diagram thereof.

Next, the functions implemented by the HMD 200 according to the present embodiment will be described. FIG. 5(b) is a functional block diagram of the HMD 200.

The HMD 200 according to the present embodiment includes a motion detector 251, a motion discriminator 252, a switching controller 253, an HMD operation controller 254, a linkage controller 255, and an HMD single operation DB 260.

The motion detector 251 detects a motion of the user 800 using the out-camera 211, the in-camera 212, and the sensor 130. As the sensor 130, for example, the left line-of-sight sensor 235, the right line-of-sight sensor 236, the acceleration sensor 232, the gyro sensor 233, the geomagnetic sensor 234, the ranging sensor 237, and the like are used.

The motion detector 251 outputs the motion as detected (hereinafter, referred to as "detected motion") to the motion discriminator 252 and the HMD operation controller 254 or the linkage controller 255. As will be described later, when the operation mode is the HMD single operation mode, the motion detector 251 outputs the detected motion to the HMD operation controller 254, and when the operation mode is the watch linked operation mode, the motion detector 251 outputs the detected motion to the linkage controller 255.

The motion discriminator 252 discriminates whether the detected motion matches a predetermined trigger motion (linkage start trigger motion or linkage termination trigger motion). The trigger motions are stored in the memory 202 in advance.

When determining that the detected motion matches the trigger motion, the motion discriminator 252 outputs a trigger motion detection instruction to the switching controller 253. On the other hand, when it does not match any trigger motion, the motion discriminator 252 outputs a mismatch signal to the motion detector 251. When the operation mode is the HMD single operation mode, upon receiving the mismatch signal, the motion detector 251 outputs the detected motion to the HMD operation controller 254. On the other hand, when the operation mode is the watch linked operation mode, the motion detector 251 disregards the detected motion.

The switching controller 253 switches the operation mode. The switching controller 253 switches the operation mode to the linked operation mode when receiving, in the single operation mode, from the watch 100, a detection notification that the watch-side linkage start trigger motion has been detected in the watch 100 within a predetermined period of time after the motion discriminator 252 determined that the motion detected by the motion detector 251 as the HMD linkage start trigger motion.

As described above, the watch 100 may detect the linkage start trigger motion first or the HMD 200 may detect the linkage start trigger motion first. Hereinafter, in the present embodiment, an example where the watch 100 detects the linkage start trigger motion first, then the HMD 200 also detects the linkage start trigger motion will be described.

In this case, in the HMD single operation mode, the switching controller 253 discriminates whether the start trigger information has been received from the watch 100 at predetermined time intervals. After receiving the start trigger information from the watch 100, when the linkage start trigger motion is detected within a predetermined period of time, the switching controller 253 transmits an operation mode switching request to the watch 100, and also switches the operation mode of the HMD 200 to the watch linked operation mode. The operation mode switching request is an instruction for the watch 100 that is the transmission destination to switch the operation mode. The Whether the switching controller 253 discriminates whether the linkage start trigger motion has been detected based on whether it has received the trigger motion detection instruction from the motion discriminator 252. Furthermore, the switching controller 253 outputs, to the motion detector 251, the operation mode after being switched.

Furthermore, the switching controller 253 switches the operation mode from the watch linked operation mode to the HMD single operation mode when the linkage termination trigger motion is detected in the watch linked operation mode. At this time, the switching controller 253 transmits termination trigger information indicating that the linkage termination trigger motion has been detected to the watch 100. When receiving the termination trigger information from the watch 100 in the watch linked operation mode, the switching controller 253 switches the operation mode from the watch linked operation mode to the HMD single operation mode.

In the HMD single operation mode, the HMD operation controller 254 controls the operations of the HMD 200 in accordance with the detected motions. In the present embodiment, the HMD operation controller 254 generates a command for operating the HMD 200 which corresponds to the operation content (HMD operation command), referring to the HMD single operation DB 260 in which the operation contents of the HMD 200 are stored in association with the detected motions, and outputs it to the relating functions.

In the watch linkage operation mode, when the HMD 200 receives the HMD operation command from the watch 100 through the communication device 227, the linkage controller 255 outputs the HMD operation command to the relating functions. Thus, the control of the operations of the HMD 200 in accordance with the operation instruction from the watch 100 can be realized.

In the following, an example of the HMD single operation DB 260 will be described. FIG. 6 is a diagram for explaining an example of the HMD single operation DB 260 according to the present embodiment.

As illustrated in FIG. 6, in the HMD single operation DB 260, HMD operation contents 262 are registered in association with detected motions 261, respectively. For example, upon detection of a motion of "tapping the wrist with the other hand" by analysis of an image acquired by the out-camera 211 in the HMD 200, an operation of "displaying a menu" is carried out in the HMD 200. Instead of the HMD operation contents 262, the HMD operation commands themselves for realizing the corresponding operations may be registered.

[Linkage Processing (Operation Mode Switching Processing)]

Next, a flow of the processing in linkage between the watch 100 and the HMD 200 having the configurations described above will be described. In the following, the processing will be described focusing on the processes for switching the operation modes. In this processing, it is assumed that the watch 100 and the HMD 200 are connected to each other for communication in advance.

Figure 7:
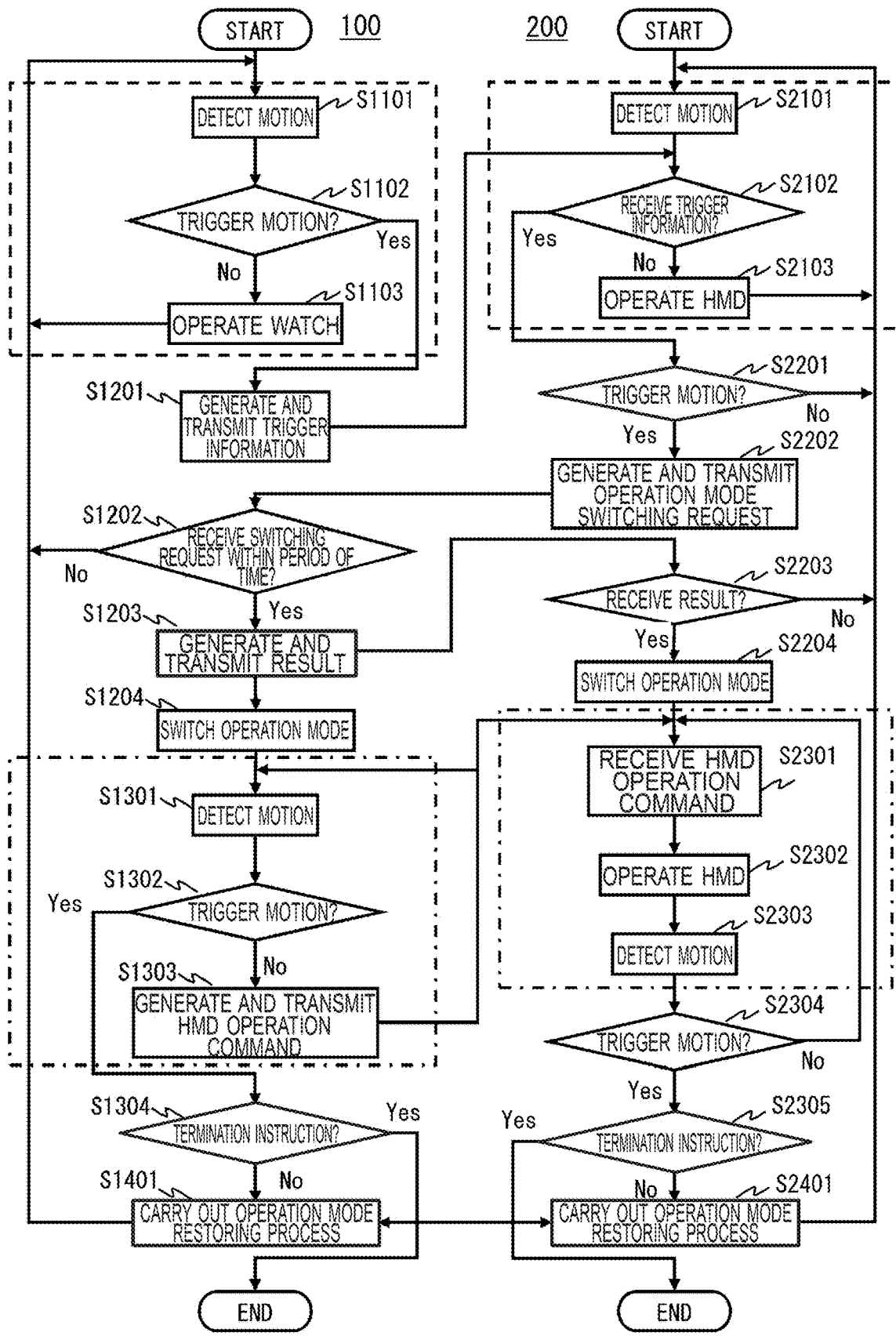
FIG. 7 illustrates a flowchart of linkage processing according to an embodiment of the present invention.

FIG. 7 illustrates a processing flow of the linkage processing (operation mode switching processing) for the information processing system 900 according to the present embodiment. FIG. 7 illustrates an example in which both the watch 100 and the HMD 200 have been started up in single operation modes as their initial states, respectively.

Although not described in the processing flow, the present processing is terminated when a motion indicating termination is detected in each motion detection step. In FIG. 7, the portions surrounded with dashed lines correspond to the processes carried out in the single operation modes, and the portions surrounded with dot-dashed lines correspond to the processes carried out in the linked operation modes.

In the watch 100, after the watch 100 was activated, the motion detector 151 detects a motion of the user 800 at predetermined time intervals (step S1101).

Each time the motion detector 151 detects the motion, the motion discriminator 152 discriminates whether the detected motion matches a predetermined trigger motion (step S1102). In the present embodiment, at this time, since the current operation mode of the watch 100 is the watch single operation mode, the motion discriminator 152 discriminates whether the detected motion matches the watch-side linkage start trigger motion for shifting the operation mode to the linked operation mode.

In step S1102, when the detected motion does not match the watch-side linkage start trigger motion, the watch single operation mode is continued as it is, and the watch operation controller 154 operates the watch 100 depending on the detected motion (step S1103) and the processing returns to step S1101. Thus, when the trigger motion is not detected, the single operation mode is continued as it is.

On the other hand, in step S1102, when determining that the detected motion matches the watch-side linkage start trigger motion, the motion discriminator 152 outputs a trigger motion detection instruction to the switching controller 153. In response to this, the switching controller 153 executes an operation mode switching process. In the present embodiment, at this time, the switching controller 153 generates trigger information indicating that a trigger motion has been performed (start trigger information), and transmits it to the HMD 200 (step S1201).

In the HMD 200, after the HMD 200 was activated, the motion detector 251 detects the motion of the user 800 at predetermined time intervals in the same manner as the watch 100 (step S2101). While the motion of the user 800 is being detected, the switching controller 253 discriminates whether the HMD 200 has received the trigger information (start trigger information) from the watch 100 (step S2102). When the HMD 200 does not receive the start trigger information, the HMD operation controller 254 controls the HMD 200 depending on the detected motion (step S2201), and the processing returns to step S2101.

On the other hand, when the switching controller 253 determines that the HMD 200 has received the start trigger information, the motion discriminator 252 discriminates whether the motion detected by the motion detector 251 matches a predetermined trigger motion (step S2201). In the present embodiment, at this time, since the current operation mode of the HMD 200 is the HMD single operation mode, the motion discriminator 252 discriminates whether the detected motion matches a trigger motion to start the linked operation mode (HMD-side linkage start trigger motion).

When the detected motion does not match the HMD-side linkage start trigger motion, the processing returns to step S2101 and is continued.

When the detected motion matches the HMD-side linkage start trigger motion, the switching controller 253 generates an operation mode switching request since, in the HMD 200, the HMD-side linkage start trigger motion was detected at the timing when the HMD 200 receives the start trigger information from the watch 100, and transmits the operation mode switching request to the watch 100 that is the transmission source of the start trigger information (step S2202).

In the watch 100, the switching controller 153 discriminates whether the watch 100 has received a predetermined reply from the HMD 200 within a predetermined period of time since the start trigger information was generated and transmitted (step S1202). In the present embodiment, at this time, the switching controller 153 discriminates whether the watch 100 has received the operation mode switching request within a predetermined period of time (step S1202). When the watch 100 receives the operation mode switching request, the switching controller 153 generates a result indicating the reception thereof (so-called, ACK), sends the result back to the HMD 200 that is the transmission source (step S1203), and switches the operation mode (step S1204). In the present embodiment, at this time, the switching controller 153 switches the operation mode from the watch single operation mode to the HMD linked operation mode. When the watch 100 does not receive the operation mode switching request in step S1202, the processing returns to step S1101 as it is.

In step S1202, even when the watch 100 does not receive the operation mode switching request within the predetermined period of time, the switching controller 153 may generate a result indicating that the operation mode switching request has not been received (ACK) and sends it back to the HMD 200 that is the transmission source.

In the HMD 200, the switching controller 253 switches the operation mode (step S2204) when receiving the result within a predetermined period of time (step S2203) after transmitting the operation mode switching request. In the present embodiment, at this time, the switching controller 253 shifts the operation mode from the single operation mode to the watch linked operation mode. On the other hand, when the HMD 200 does not receive the result of the switching request, the processing returns to step S2101 and is continued.

As described above, the operation modes are switched only when the linkage start trigger motions are detected within predetermined periods of time in both the watch 100 side and the HMD 200, respectively.

In the watch 100, when the motion detector 151 detects the motion after the operation mode is shifted to the HMD linked operation mode, the motion discriminator 152 discriminates whether the detected motion matches a predetermined trigger motion each time the motion detector 151 detects the motion (step S1301). In the present embodiment, at this time, since the current operation mode of the watch 100 is the HMD linked operation mode, the motion discriminator 152 discriminates whether the operation mode matches the trigger motion (watch-side linkage termination trigger motion) for terminating the linked operation mode.

When the detected motion does not match the linkage termination trigger motion, the HMD operation command generator 155 generates an HMD operation command in accordance with the detected motion and transmits it to the HMD 200 (step S1303).

On the other hand, when the detected motion matches a trigger motion, the motion discriminator 152 discriminates whether the detected motion matches an operation termination motion for the watch 100 (step S1304). When the detected motion matches the operation termination instruction, the processing of the watch 100 is made terminated. At this time, the HMD 200 is notified of the termination of the operation of the watch 100. In the HMD 200, upon reception of the notification, the operation mode is shifted to the single operation mode.

On the other hand, when the detected motion does not match the operation termination instruction, the switching controller 153 carries out an operation mode restoring process which will be described later (step S1401).

In the HMD 200 of which the operation mode has been shifted to the watch linked operation mode, when the HMD 200 receives an HMD operation command from the watch 100 (step S2301), the linkage controller 255 controls (operates) the operations of the HMD 200 in accordance with the HMD operation command (step S2302).

During this, the motion detector 251 continuously carries out the motion detection (step S2303). Each time the motion detector 251 detects a motion, the motion discriminator 252 discriminates whether the detected motion matches a trigger motion (step S2304). In the present embodiment, at this time, the motion discriminator 252 discriminates whether the detected motion matches the linkage termination trigger motion. When the detected motion does not match a trigger motion, the processing returns to step S2301 and is continued.

On the other hand, when the detected motion matches a trigger motion, firstly, the motion discriminator 252 discriminates whether the detected motion matches an operation termination instruction to the HMD 200 (step S2305). When the detected motion matches an operation termination instruction, the processing is made terminated. At this time, the watch 100 is notified of the termination of the operation of the HMD 200. In the watch 100, upon reception of the notification, the operation mode is shifted to the single operation mode.

On the other hand, when the detected motion does not match an operation termination instruction, the switching controller 253 carries out the operation mode restoring process (step S2401).

In the following, the operation mode restoring process executed in step S1401 and step S2401 will be described. In the present embodiment, when the linkage termination trigger motion is detected in either of the watch 100 and the HMD 200, the operation mode thereof is restored from the linked operation mode to the single operation mode.

For example, when it is determined that the detected motion matches the linkage termination trigger motion in the watch 100, the switching controller 153 communicates the termination trigger information indicating that the linkage termination trigger motion has been detected to the HMD 200, and switches the operation mode of the watch 100 to the watch single operation mode. In the HMD 200 that has received the termination trigger information from the watch 100, the switching controller 253 switches the operation mode of the HMD 200 to the HMD single operation mode.

On the other hand, for example, when it is determined that the detected motion matches the linkage termination trigger motion in the HMD 200, the switching controller 253 communicates the termination trigger information indicating that the linkage termination trigger motion has been detected to the watch 100, and switches the operation mode of the HMD 200 to the HMD single operation mode. In the watch 100 that has received the termination trigger information from the HMD 200, the switching controller 153 switches the operation mode of the watch 100 to the watch single operation mode.

Upon completion of the operation mode restoring process, in the watch 100, the processing returns to step S1101 and the operations are continued in the watch single operation mode. In the same manner, in the HMD 200, upon completion of the operation mode restoring process, the processing returns to step S2101 and the operations are continued in the HMD single operation mode.

In the present embodiment, when a trigger motion to start the linkage is detected in the HMD 200 within a predetermined period of time (T1) after the watch 100 receives the trigger information to start the linkage, the operation mode is shifted to the linked operation mode. Accordingly, the HMD 200 may be configured to hold the trigger information received from the watch 100 only for the period of time T1, and discriminate whether it has received a linkage start trigger motion in the period of time T1 in step S2201.

As described above, in the information processing system 900 according to the present embodiment, only when the HMD 200 detects the linkage start trigger motion within a predetermined period of time after the watch 100 detects the linkage start trigger motion, the operation modes of both the watch 100 and the HMD 200 are shifted to the linked operation modes. For example, when only one of them detects the linkage start trigger motion, or even when both of them detect the linkage start trigger motion but not within a predetermined period of time, the operation modes thereof are not shifted to the linked operation modes. On the other hand, in the linked operation mode, when the linkage termination trigger motion is detected on either the watch 100 or the HMD 200, the operation modes thereof are shifted to the single operation mode.

As described above, for the case of switching the operation mode only using a trigger motion performed for the watch 100 or the HMD 200, in the present embodiment, the trigger motions for them are detected in a simple manner so that the operation modes can be shifted to the linked operation modes. This enables the operation mode switching to be performed with high usability and reliability, and the risk of misidentification and malfunctions in the operation mode switching selection to be eliminated or reduced significantly.

Example of Display

In the following, an example of display in the HMD 200 will be described. In the present embodiment, display on the display device 221 (display portion) is controlled by the HMD operation controller 254 in the HMD single operation mode and controlled by the linkage controller 255 in the watch linked operation mode.

Figure 8A:
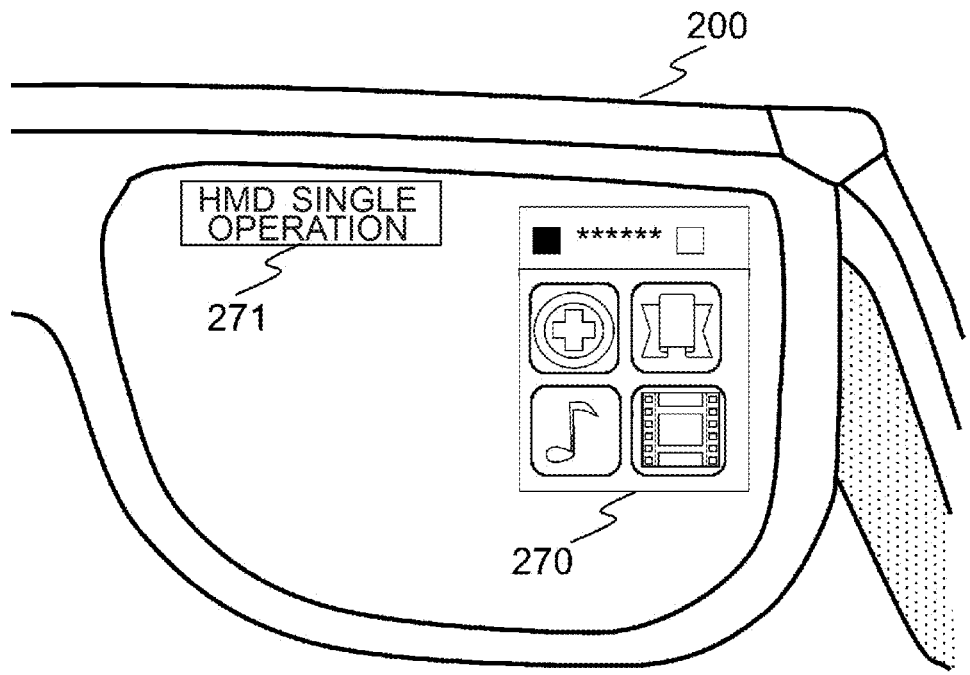
FIG. 8(a) and FIG. 8(b) are diagrams for explaining display examples on a display device of an HMD according to an embodiment of the present invention.
Figure 8B:
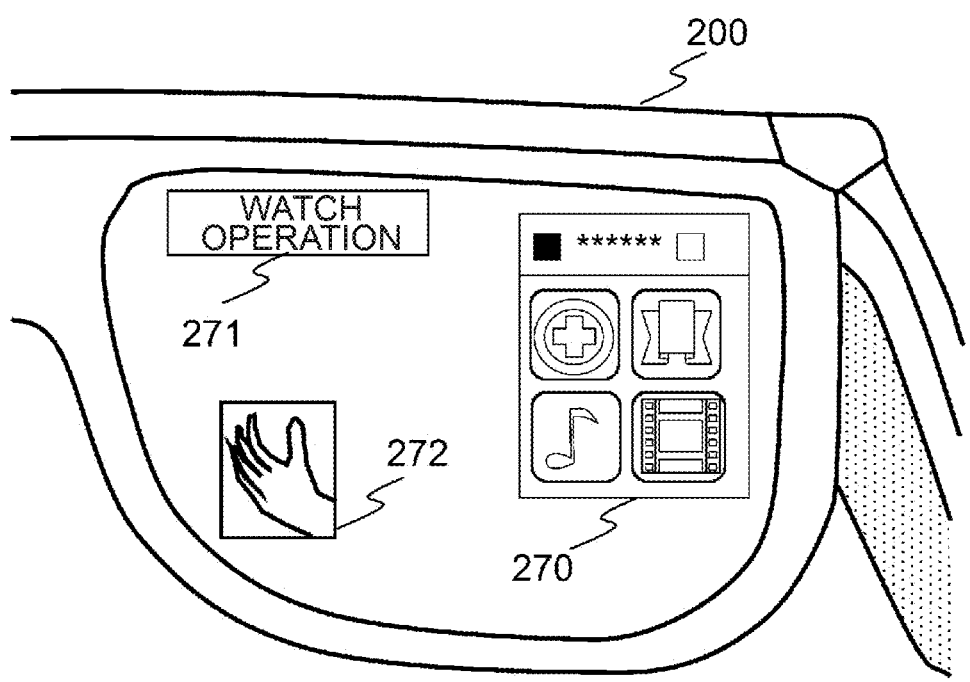

As illustrated in FIG. 8(a) and FIG. 8(b), the display device 221 according to the present embodiment includes a menu display area 270 and an operation mode display area 271.

In the menu display area 270, a menu is displayed as a virtual object. The user 800 selects a desired operation from the menu and operates the HMD 200. The selection is performed, for example, with a line of sight. In this case, in the HMD 200, the sensors such as the left line-of-sight sensor 235 and the right line-of-sight sensor 236 detect the intersection position between the line-of-sight direction and the display device 221 so that which item in the menu has been selected can be determined.

An operation mode is displayed in the operation mode display area 271. FIG. 8(*a*) illustrates an example of display when the HMD 200 is in the HMD single operation mode. FIG. 8(*b*) illustrates an example of display when the HMD 200 is in the watch linkage operation mode.

As illustrated in FIG. 8(*b*), for the watch linked operation mode, the display device 221 may further include an operation image display area 272. In the operation image display area 272, an operation image showing what kind of operation the user 800 is performing is displayed. The operation image is, for example, a simulation image of the hand which expresses a motion of the user 800 detected by the watch 100. The operation image is an image of an operation corresponding to an HMD operation command transmitted from the watch 100.

For example, when the HMD 200 receives an HMD operation command corresponding to "click on selected item" within the HMD operation contents 172 of the HMD linkage operation DB 170 illustrated in FIG. 4(*b*) from the watch 100, an image expressing "lower the hand quickly" which is the motion corresponding thereto is generated. In this example, the linkage controller 255 generates a motion image corresponding to an HMD operation command as received. The HMD 200 stores the motion images associated with the HMD operation commands in the memory 202 in advance.

The operation information on the user 800 detected by the watch 100 may be transmitted to the HMD 200 together with the HMD operation command, and the linkage controller 255 may generate an operation image (simulation image) using the information.

Displaying the operation mode in the operation mode display area 271 enables the user 800 to clearly and easily know how the HMD 200 is being operated. The operation mode may be displayed using an image such as an icon instead of using characters.

As described above, displaying an operation image on the HMD 200 enables the user 800 to intuitively know how the motion is detected by the watch 100. This may cause the user to move his or her hand so as to improve the accuracy in detection by the watch 100.

Furthermore, as described above, the HMD 200 that is the second information processing device is capable of mutual communication with the watch 100 that is an external information processing device, and includes the memory 202 configured to store a predetermined linkage start trigger motion, the motion detector 251 configured to detect a motion of the user 800 wearing the HMD 200, a motion discriminator 252 configured to discriminate whether the motion detected by the motion detector 251 is the linkage start trigger motion, and the switching controller 253 configured to switch an operation mode of the HMD 200. The operation mode includes a linked operation mode for receiving an operation command to operate the HMD 200 from the watch 100 and operating the HMD 200 in accordance with the operation command, and a single operation mode for generating the operation command to operate the HMD 200 in the HMD 200 and operating the HMD 200 in accordance with the operation command as generated. In the single operation mode, the switching controller 253 switches the operation mode to the linked operation mode when both a determination made by the motion discriminator 252, in which the motion as detected is the HMD-side linkage start trigger motion, and a reception of a detection notification from the watch 100, in which the watch-side linkage start trigger motion has been detected in the watch 100 is indicated, occur within a predetermined period of time.

The HMD 200 that is the second information processing device is capable of mutual communication with the watch 100 that is the external information processing device, and includes a memory 202 configured to store a predetermined linkage start trigger motion, a motion detector 251 configured to detect a motion of the user 800 wearing the HMD 200, the motion discriminator 252 configured to discriminate whether the motion detected by the motion detector 251 is the linkage start trigger motion, and the switching controller 253 configured to switch an operation mode of the HMD 200. The operation mode includes a linked operation mode for receiving an operation command to operate the HMD 200 from the watch 100 and operating the HMD 200 in accordance with the operation command, and a single operation mode for generating the operation command to operate the HMD 200 in the HMD 200 and operating the HMD 200 in accordance with the operation command as generated. In the single operation mode, the switching controller 253 switches the operation mode to the linked operation mode when both a determination made by the motion discriminator 252, in which the motion as detected is the linkage start trigger motion, and a reception of a detection notification from the watch 100, in which a predetermined external linkage start trigger motion has been detected in the watch 100 is indicated, occur within a predetermined period of time.

As described above, according to the present embodiment, in the information processing system 900 including a plurality of information processing devices such as the watch 100 and the HMD 200, for example, in the case where, in the watch 100, the operation mode for operating the watch 100 that is the own device and the operation mode for operating the HMD 200 can be executed, switching of the operation mode can be easily and accurately performed. Specifically, upon detection of trigger motions in both the two information processing devices which are the watch 100 and the HMD 200, the operation mode is switched from the single operation mode, in which the information processing device to be operated in accordance with a user motion detected by the watch 100 is the watch 100, to the linked operation mode, in which the information processing device to be operated in accordance with a user motion detected by the watch 100 is the HMD 200. Therefore, comparing with the case where the operation mode is switched using only a trigger motion for either the watch 100 or the HMD 200, in the present embodiment, the operation mode is switched using trigger motions for both the devices, which are detected in a simple manner, the operation mode can be switched easily and reliably with high accuracy. This enables the possibilities of misidentification and malfunctions in switching the operation mode to be eliminated or significantly reduced.

Furthermore, in the embodiment described above, the myoelectric information acquired by the myoelectric sensor 131 is used to detect a trigger action in the watch 100. This enables both the information processing devices which are the watch 100 and the HMD 200 to be freely operated even in a situation where the user 800 is allowed to use only one hand and thus, for example, cannot touch the watch 100.

That is, according to the present embodiment, in the information processing system including a plurality of information processing devices, in which an operation target can be switched, in switching and selecting an operation mode indicating which of the plurality of information processing devices is to be operated, it is possible to switch and select the operation mode with high accuracy in a convenient manner. The present invention is particularly advantageous in the information processing devices, such as the watch 100 and the HMD 200, having difficulties in detection of operations as performed therefor.

First Modification

In the embodiment described above, in the linkage operation mode, it is configured such that, the watch 100 generates an HMD operation command based on the detected motion and transmits the HMD operation command to the HMD 200, however, the present invention is not limited thereto. For example, it may be configured such that the watch 100 transmits the information indicative of the detected motion to the HMD 200 so that an operation command corresponding to the motion can be generated in the HMD 200.

Second Modification

Figure 9:
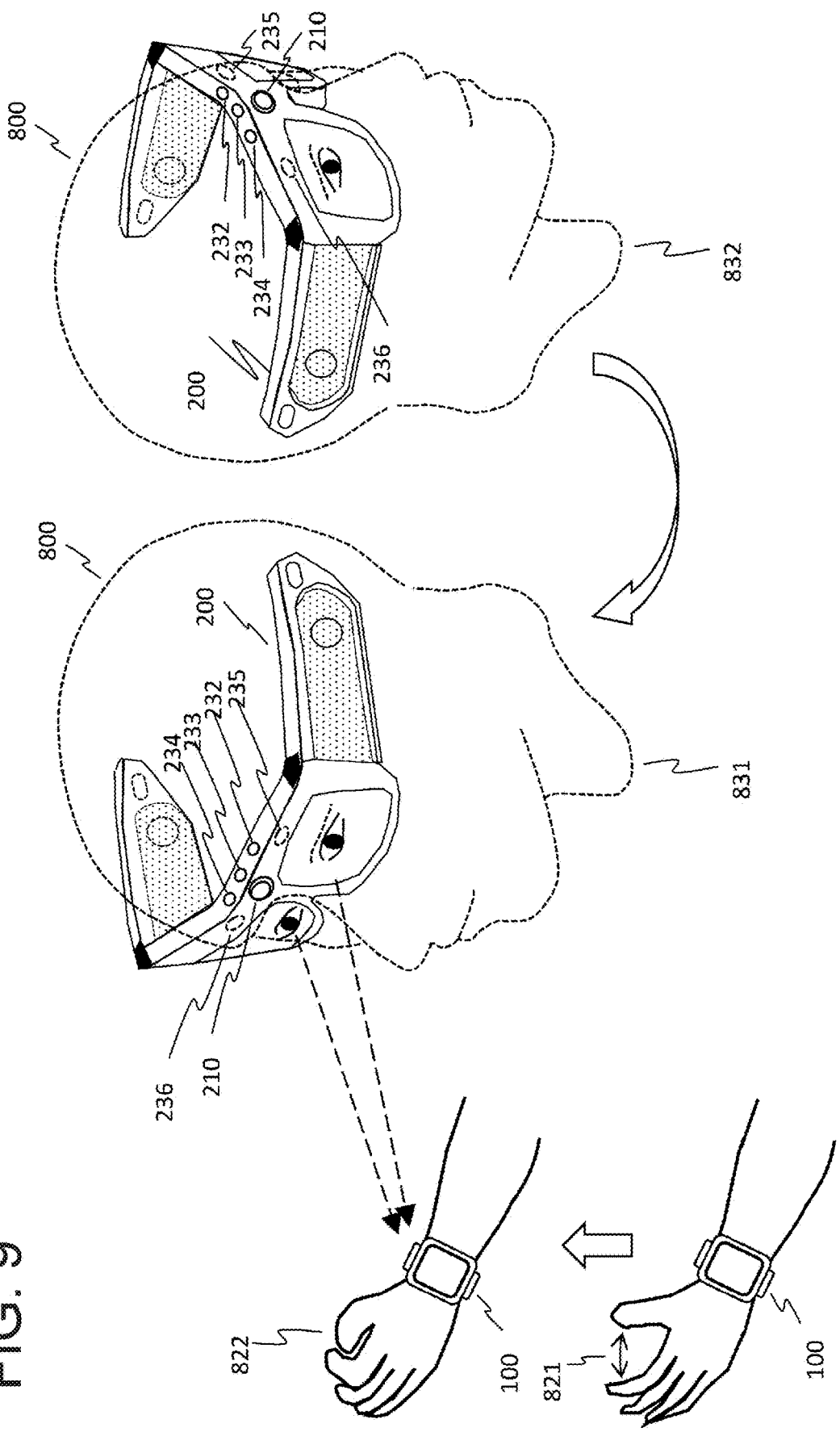
FIG. 9 is a diagram for explaining the outline of an information processing system according to a modification of the present invention.

Furthermore, the predetermined linkage start trigger motion is not limited to those described in the embodiment above. FIG. 9 is a diagram for explaining a further example of the linkage start trigger motion.

FIG. 9 illustrates an example where a motion in which the hand is clenched is predefined as the linkage start trigger motion for the watch 100. In the watch 100, the myoelectric sensor 131 detects a gesture motion in which a state 821 with the hand being opened is shifted to a state 822 with the hand being closed and clenched.

On the other hand, FIG. 9 illustrates an example where a motion in which the user 800 wearing the HMD 200 directs his or her line of sight toward the watch 100 is predefined as the linkage start trigger motion for the HMD 200. In the HMD 200, the left line-of-sight sensor 235 and the right line-of-sight sensor 236 capture the change in a state of the user 800 from a state 831 with his or her line of sight directing toward the watch 100 from a state 832 with the line of sight directing in a direction different from the direction of the watch 100, and detect it as the linkage start trigger motion.

The state 831 in which the user 800 is directing his or her line of sight toward the watch 100 may be captured using the acceleration sensor 232, the gyro sensor 233, and the geomagnetic sensor 234 which detect a posture state and a motion of the user 800.

When the linkage start trigger motions are detected in the watch 100 and the HMD 200 at substantially the same timing, the watch 100 transmits, to the HMD 200, the HMD operation command generated based on the motion detected by the watch 100 as the operation information for operating the HMD 200.

In the embodiment described above, the example in which a gesture with the hand and the finger is detected using the myoelectric sensor 131 has been described for the detection of motions in the watch 100 including the trigger motions, however, the present invention is not limited thereto. The motions performed for the watch 100 may be detected by the sensor 130 or other means, but not limited to the myoelectric sensor 131. For example, a posture state and a motion of the watch 100 may be detected using the sensor 130 such as the acceleration sensor 132, the gyro sensor 133, or the geomagnetic sensor 134, so that motions such as "lifting and twisting the hand" and "lifting the hand and stopping the motion" can be acquired.

Furthermore, in the embodiment described above, as the trigger motion detection in the HMD 200, the example where the change in the state of the eyes of the user 800 is detected by the line-of-sight sensor each of the left line-of-sight sensor 235 and the right line-of-sight sensor 236 or both of them) and the example where the change in the state of the head of the user 800 is detected by the acceleration sensor 232, the gyro sensor 233, and the geomagnetic sensor 234 have been described, however, trigger motions may be detected using the sensor 230 or other means.

That is, it is obvious that motions to be detected in the first information processing device and the second information processing device are not limited to the motions described above as long as they can be detected by sensors or any means, and the same advantageous effects as those described above can be obtained.

Third Modification

In the embodiment described above, the example where the linkage start trigger motion and the linkage termination trigger motion are different from each other has been described, however, they may be the same with each other. In this case, each of the motion discriminator 152 and the motion discriminator 252 discriminates which of the trigger motion the detected motion matches based on the combination with the operation mode of the own device. That is, when a trigger motion is detected with the operation mode of the own device being in the single operation mode, it is determined that the detected motion is the linkage start trigger motion, and when a trigger motion is detected with the operation mode of the own device being in the linked operation mode, it is determined that the detected motion is the linkage termination trigger motion.

Fourth Modification

Furthermore, in the embodiment described above, the example where the watch 100 (operation device) detects a trigger motion first, transmits it to the HMD 200 (device to be operated), and receives a switching request from the HMD 200 has been described, however, the HMD 200 may detect a trigger motion first and transmit it to the watch 100.

In this case, the switching controller 153 transmits an operation mode switching request to the HMD 200 when it is determined that the motion detected by the motion detector 151 is the linkage start trigger motion within a predetermined period of time after the watch 100 receives the start trigger information indicating that the HMD-side linkage start trigger motion has been detected from the HMD 200. At this time, the switching controller 153 switches the operation mode of the watch 100 to the HMD linked operation mode.

In the HMD 200, the switching controller 253 transmits the start trigger information to the watch 100 upon detecting the HMD-side linkage start trigger motion. Then, when the HMD 200 receives the operation mode switching request within a predetermined period of time from the transmission of the start trigger information, the switching controller 253 switches the operation mode of the HMD 200 to the HMD linked operation mode.

In the linked operation mode, the HMD 200 is operated based on the motion detected by the watch 100, which, however, may be reversed. That is, the watch 100 may be operated based on the motion detected by the HMD 200.

As described above, the information processing system 900 according to the present embodiment is the information processing system including the first information processing device and the second information processing device which are linked to each other for mutual communication, and when the second linkage start trigger motion is detected in the second information processing device within a predetermined period of time after the first linkage start trigger motion is detected in the first information processing device, each of the first information processing device and the second information processing device is operated in the linked operation mode. The linked operation mode is either one of a first linked operation mode for operating the second information processing device in accordance with a motion of a user of the first information processing device detected in the first information processing device, or a second linked operation mode for operating the first information processing device in accordance with a motion of a user of the second information processing device detected in the second information processing device.

Fifth Modification

In the embodiment and modifications described above, an operation mode switching request is generated and transmitted in the device different from the device that detects the linkage start trigger motion first, however, the present invention is not limited thereto. An operation mode switching request may be generated in the device that detected the linkage start trigger motion first.

This modification will be described referring to an example where the watch 100 detects the linkage start trigger motion first. When the linkage start trigger motion is detected in step S1102 that has been described above, the switching controller 153 generates the start trigger information and transmits it to the HMD 200. In the HMD 200, after receiving the start trigger information in step S2102, when the linkage start trigger information is detected within the processing period of time in step S2201, the switching controller 253 generates the start trigger information (second start trigger information) and transmits it to the watch 100. That is, in the embodiment described above, as a response, an operation mode switching request is generated in the HMD 200 and transmitted to the watch 100, on the other hand, in the present modification, instead thereof, as a response, in the HMD 200 as well, the start trigger information is transmitted to the watch 100.

When the watch 100 receives the start trigger information from the HMD 200 within a predetermined period of time after detecting the start trigger motion first or generating and transmitting the start trigger information, the switching controller 153 generates an operation mode switching request and transmits it to the HMD 200. Furthermore, the switching controller 153 switches the operation mode of the watch 100. After providing a response, upon receiving the operation mode switching request, the HMD 200 switches the operation mode.

When the linkage start trigger motion is first detected in the HMD 200, the start trigger information is transmitted and received in the opposite manner to the example described above, and the switching controller 253 of the HMD 200 finally transmits an operation mode switching request to the watch 100 so that the operation modes of both the devices can be switched.

Sixth Modification

Furthermore, in the embodiment described above, when the linkage termination trigger motion is detected in either of the devices, the linkage is terminated and the operation modes are restored to the single operation modes. However, the present invention is not limited thereto. It may be configured to terminate the linkage only when the linkage termination trigger motions are detected within a predetermined period of time in both the devices.

Seventh Modification

In the embodiment described above, the example where the operation mode of the HMD 200, which is the second information processing device, immediately after its activation is the HMD single operation mode. However, the present invention is not limited thereto. The operation mode of the HMD 200 immediately after being activated may not be limited thereto as long as the HMD 200 can receive the start trigger information from the watch 100.

Eighth Modification

In the embodiment described above, the watch 100 is exemplified by the first information processing device and the HMD 200 is exemplified by the second information processing device, however, the present invention is not limited thereto. The first information processing device and the second information processing device include all devices having the functions capable of detecting an operation performed for the own devices.

It should be noted that, in the information processing system 900 according to the present embodiment, the same advantageous effects can be obtained if using information processing devices other than a smartwatch and an HMD as the first information processing device and the second information processing device. For example, the first information processing device may be a smartphone that is held in a hand and used, and the second information processing device may be a personal computer. In this case, for example, in the smartphone, change in the posture of the smartphone and a motion thereof are set as trigger motions while, in the personal computer, the posture of the user 800 viewing the personal computer, motions of the lines of sight, and the like are set as trigger motions, and the personal computer is operated in accordance with the change in the posture of the smartphone and the motion thereof.

Ninth Modification

Figure 10:
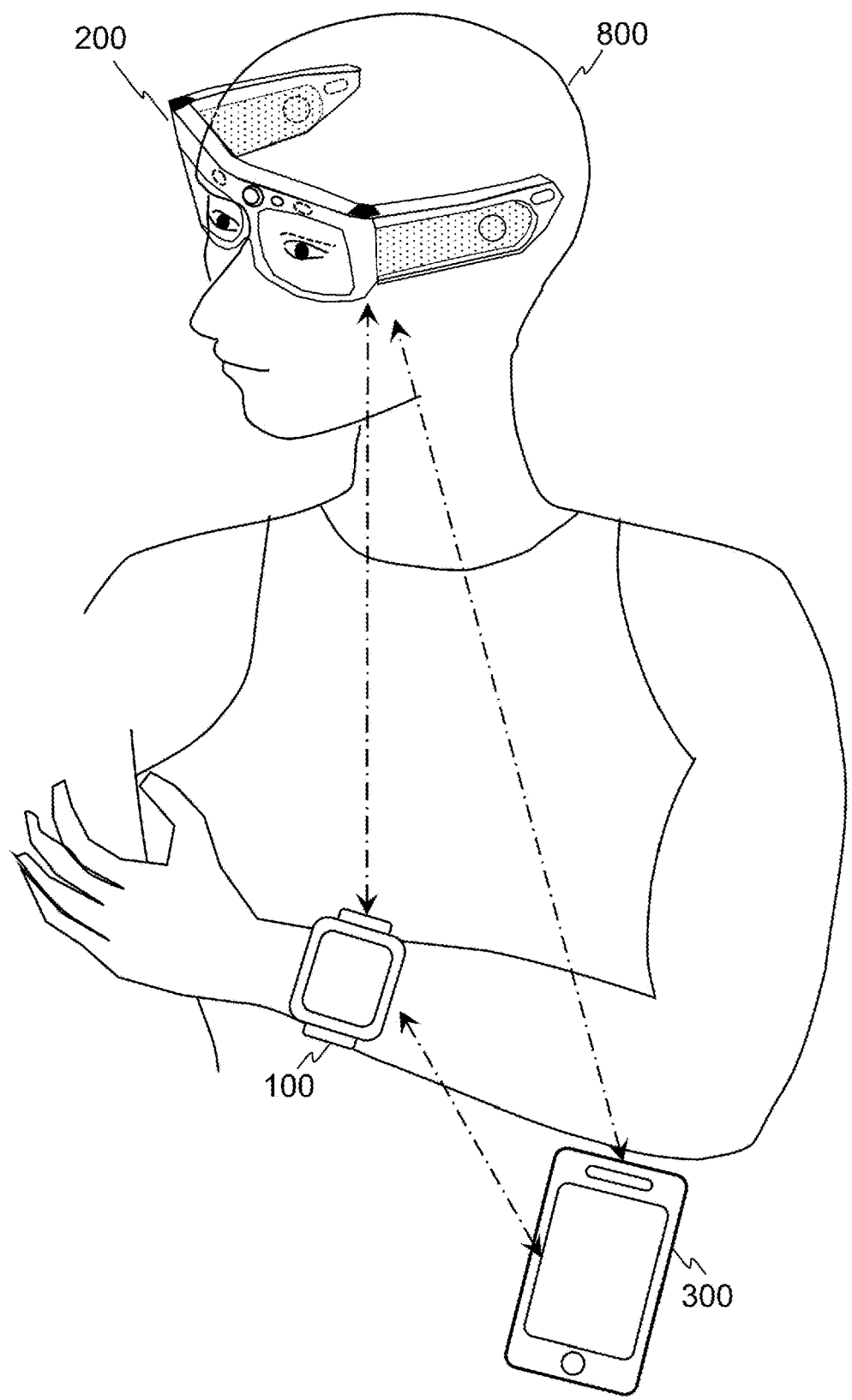
FIG. 10 is a diagram for explaining two-party linkage processing and three-party linkage processing according to a modification of the present invention.

As illustrated in FIG. 10, the information processing system 900 may further include a third information processing device. FIG. 10 illustrates an example where the third information processing device is a smartphone 300. The watch 100, the HMD 200, and the smartphone 300 are linked to each other in advance for mutual communication.

In this case, the linkage processing may be carried out for two-party linkage. Specifically, for example, when the watch 100 and the HMD 200 detect predetermined first linkage start trigger motions at substantially the same timing, linkage between the watch 100 and the smartphone 300 is started, and when the watch 100 and the HMD 200 detect predetermined second linkage start trigger motions at substantially the same timing, linkage between the HMD 200 and the smartphone 300 is started.

During the linkage, for example, operation commands are transmitted from the smartphone 300 to the watch 100 and the HMD 200, respectively. Alternatively, conversely, the operation commands may be transmitted from the watch 100 or the HMD 200 to the smartphone 300. This enables, for example, the user 800 to use the function of the smartphone 300 by operating the watch 100 or the HMD 200.

For example, the user 800 can operate the smartphone 300 with the smartphone 300 being placed in a pocket, a bag, or the like.

Furthermore, the linkage processing may be carried out for three-party linkage. In this case, for example, when the watch 100 and the HMD 200 detect predetermined linkage start trigger motions at substantially the same timing, the three-party linkage among the watch 100, the HMD 200, and the smartphone 300 is started.

In the three-party linkage, for example, as in the embodiment or modification described above, the linkage processing is carried out between the watch 100 and the HMD 200, and all processing details carried out in each of the information processing devices are transmitted to the smartphone 300 so that all processing histories can be accumulated in the smartphone 300. Alternatively, the three-party linkage may be carried out in such a manner that a screen of the smartphone 300 is transferred and displayed on the HMD 200 so that the smartphone 300 can be operated by the watch 100.

In the above, the embodiments of the present invention have been described, and of course, the configurations for implementing the technical features according to the present invention are not limited to those described in these embodiments and various modifications can be made. For example, the embodiments described above have been explained in detail for the purpose of making the present invention to be understood easily, and thus are not necessarily limited to those having all the configurations as described. Furthermore, a part of the configuration of an embodiment may be replaced with the configuration of a further embodiment, and the configuration of an embodiment may include the configuration of a further embodiment, which are all included in the scope of the present invention. The numerical values and messages appearing in the text and drawings are merely examples, and accordingly, the advantageous effects of the present invention are not impaired even if different ones are used.

Furthermore, each of the programs described in the examples of the processing may be an independent program, or a plurality of programs configuring one application program. Still further, the orders of executing the processes may be changed.

Still further, some or all the functions and the like of the present invention may be implemented by hardware, for example, by designing them with integrated circuitry. Still further, a microprocessor unit, a CPU, or the like may interpret and execute an operation program so that some or all the functions and the like of the present invention can be implemented by software. Still further, the implementation range of the software is not limited, and hardware and software may be used in combination. Still further, some or all the functions may be realized by a server. Note that the server may be the one which executes the functions in cooperation with other components by communication, which may be, for example, a local server, a cloud server, an edge server, a net service, or the like. Information such as programs, tables, and files for realizing the functions may be stored in a recording device such as a memory, a hard disk, or an SSD (Solid State Drive), or a recording medium such as an IC card, an SD card, or a DVD, or may be stored in a device on a communication network.

Still further, the control lines and information lines which are considered to be necessary for the purpose of explanation are indicated herein, but not all the control lines and information lines of actual products are necessarily indicated. It may be considered that almost all the components are actually connected to each other.

REFERENCE SIGNS LIST

100: watch, 101: processor, 102: memory, 103: bus, 111: camera, 121: display device, 122: first input I/F, 123: second input I/F, 124: audio input device, 125: audio output device, 126: vibration generation device, 127: communication device, 130: sensor, 131: myoelectric sensor, 132: acceleration sensor, 133: gyro sensor, 134: geomagnetic sensor, 151: operation detector, 152: motion discriminator, 153: switching controller, 154: watch operation controller, 155: HMD operation command generator, 160: watch single operation DB, 161: detected operation, 162: watch operation content, 170: HMD linked operation DB, 171: detected operation, 172: HMD operation content 200: HMD, 201: processor, 202: memory, 203: bus, 210: camera, 211: out-camera, 212: in-camera, 221: display device, 223: input I/F, 224: audio input device, 225: audio output device, 226: vibration generation device, 227: communication device, 230: sensor, 232: acceleration sensor, 233: gyro sensor, 234: geomagnetic sensor, 235: left line-of-sight sensor, 236: right line-of-sight sensor, 237: ranging sensor, 251: operation detector, 252: operation discriminator, 253: switching controller, 254: HMD operation controller, 255: linkage controller, 260: HMD single operation DB, 261: detected motion, 262: HMD operation content, 270: menu display area, 271: operation mode display area, 272: operation image display area 300: smartphone, 800: user, 802: state, 803: state, 804: state, 811: state, 812: state, 821: state, 822: state, 831: state, 832: state, 900: information processing system

The invention claimed is:

1. An information processing device capable of mutual communication with an external device that is an external information processing device, the information processing device comprising:
   a storage configured to store a predetermined linkage start trigger motion;
   a motion detector configured to detect a motion of a user wearing the information processing device;
   a motion discriminator configured to discriminate whether the motion detected by the motion detector is the predetermined linkage start trigger motion; and
   a switching controller configured to switch an operation mode of the information processing device,
   wherein the operation mode includes:
      a linked operation mode for generating an operation command to operate the external device in the information processing device and transmitting the operation command to the external device; and
      a single operation mode for generating the operation command to operate the information processing device in the information processing device and operating the information processing device in accordance with the operation command as generated,
   wherein, in the single operation mode, the switching controller switches the operation mode to the linked operation mode when both a determination made by the motion discriminator, in which the motion as detected is the predetermine linkage start trigger motion, and a reception of a detection notification from the external device, in which a predetermined external linkage start trigger motion has been detected in the external device is indicated, occur within a predetermined period of time, and wherein, in the single operation mode, when it is determined that the motion detected by the motion detector is the predetermined linkage start trigger motion before the reception of the detection notification, the switching controller is configured to:
- transmit start trigger information indicating that the predetermined linkage start trigger motion has been detected to the external device;
- after transmitting the start trigger information, receive a switching request for switching the operation mode as the detection notification from the external device within the predetermined period of time; and
- after receiving the switching request, switch the operation mode to the linked operation mode.

2. The information processing device according to claim 1, wherein
the storage further stores a predetermined linkage termination trigger motion,
the motion discriminator further discriminates whether the motion detected by the motion detector is the predetermined linkage termination trigger motion, and
in the linked operation mode, when it is determined that the motion detected by the motion detector is the predetermined linkage termination trigger motion, the switching controller transmits termination trigger information indicating that the predetermined linkage termination trigger motion has been detected to the external device, and also switches the operation mode to the single operation mode.

3. The information processing device according to claim 1, wherein
in the single operation mode, the switching controller does not switch the operation mode to the linked operation mode when one of the determination by the motion discriminator, in which the motion as detected is the predetermined linkage start trigger motion, or the reception of the detection notification from the external device, in which the predetermined external linkage start trigger motion has been detected in the external device is indicated, does not occur in the predetermined period of time.

4. The information processing device according to claim 1, further comprising:
an external operation command generator configured to generate the operation command for the external device as an external operation command, and transmit the external operation command to the external device; and
an operation controller configured to generate the operation command for the information processing device as an own device operation command, and control an operation of the information processing device, wherein
the storage further stores the operation command associated with the motion detected by the motion detector,
in the linked operation mode, the external operation command generator generates, as the external operation command, the operation command stored in the storage in association with the motion detected by the motion detector, and
in the single operation mode, the operation controller generates, as the own device operation command, the operation command stored in the storage in association with the motion detected by the motion detector.

5. The information processing device according to claim 1, wherein
in the single operation mode, when it is determined that the motion detected by the motion detector within the predetermined period of time is the predetermine linkage start trigger motion after the reception of the detection notification, the switching controller is configured to:
- transmit a switching request for switching the operation mode to the external device; and
- after transmitting the switching request, switch the operation mode to the linked operation mode.

6. An information processing device capable of mutual communication with an external device that is an external information processing device, the information processing device comprising:
a storage configured to store a predetermined linkage start trigger motion;
a motion detector configured to detect a motion of a user wearing the information processing device;
a motion discriminator configured to discriminate whether the motion detected by the motion detector is the predetermined linkage start trigger motion; and
a switching controller configured to switch an operation mode of the information processing device,
wherein the operation mode includes:
- a linked operation mode for receiving an operation command to operate the information processing device from the external device and operating the information processing device in accordance with the operation command; and
- a single operation mode for generating the operation command to operate the information processing device in the information processing device and operating the information processing device in accordance with the operation command as generated, wherein, in the single operation mode, the switching controller switches the operation mode to the linked operation mode when both a determination made by the motion discriminator, in which the motion as detected is the predetermine linkage start trigger motion, and a reception of a detection notification from the external device, in which a predetermined external linkage start trigger motion has been detected in the external device is indicated, occur within a predetermined period of time, wherein, in the single operation mode, when it is determined that the motion as detected is the predetermined linkage start trigger motion within the predetermined period of time after the reception of the detection notification, the switching controller is configured to:
- transmit a switching request for switching the operation mode to the external device; and
- after transmitting the switching request, switch the operation mode to the linked operation mode.

7. The information processing device according to claim 6, wherein
the storage further stores a predetermined linkage termination trigger motion,
the motion discriminator further discriminates whether the motion detected by the motion detector is the predetermined linkage termination trigger motion, and
in the linked operation mode, when it is determined that the motion detected by the motion detector is the predetermined linkage termination trigger motion, the switching controller transmits termination trigger information indicating that the predetermined linkage termination trigger motion has been detected to the external device, and also switches the operation mode to the single operation mode.

8. The information processing device according to claim 6, wherein in the single operation mode, the switching controller does not switch the operation mode to the linked operation mode when either one of the determination by the motion discriminator, in which the motion as detected is the predetermined linkage start trigger motion, or the reception of the detection notification from the external device, in which the predetermined external linkage start trigger motion has been detected in the external device is indicated, does not occur in the predetermined period of time.

9. The information processing device according to claim 6, further comprising:

a linkage controller configured to receive the operation command from the external device as an own device operation command, and control an operation of the information processing device in accordance with the own device operation command; and an operation controller configured to generate the operation command for the information processing device as the own device operation command, and control the operation of the information processing device in accordance with the own device operation command, wherein the storage further stores the operation command associated with the motion detected by the motion detector, and in the single operation mode, the operation controller generates, as the own device operation command, the operation command stored in the storage in association with the motion detected by the motion detector.

10. The information processing device according to claim 9, further comprising a display portion, wherein the storage further stores a motion image expressing a motion of the user which corresponds to the operation command received from the external device, and when the linkage controller receives the operation command, the switching controller displays the motion image stored in association with the operation command on the display portion.

11. The information processing device according to claim 6, wherein in the single operation mode, when it is determined that the motion detected by the motion detector is the predetermined linkage start trigger motion before the reception of the detection notification, the switching controller is configured to:

transmit start trigger information indicating that the predetermined linkage start trigger motion has been detected to the external device;

after transmitting the start trigger information, receive, as the detection notification, a switching request for switching the operation mode from the external device within the predetermined period of time; and after receiving the switching request, switch the operation mode to the linked operation mode.

12. An information processing system comprising:

a first information processing device; and a second information processing device, the first information processing device and the second information processing device being linked to each other for mutual communication, each of the first information processing device and the second information processing device being operated in a linked operation mode when a second predetermined linkage start trigger motion is detected in the second information processing device within a predetermined period of time after a first predetermined linkage start trigger motion is detected in the first information processing device, and the linked operation mode being either one of a first linked operation mode for operating the second information processing device in accordance with a motion of a user of the first information processing device detected in the first information processing device, or a second linked operation mode for operating the first information processing device in accordance with a motion of a user of the second information processing device detected in the second information processing device.

13. The information processing system according to claim 12, wherein when the second predetermined linkage start trigger motion is not detected in the second information processing device within the predetermined period of time after the first predetermined linkage start trigger motion is detected in the first information processing device, each of the first information processing device and the second information processing device is operated in a single operation mode, and the single operation mode is an operation mode for operating the first information processing device in accordance with the motion of the user of the first information processing device detected in the first information processing device, and also operating the second information processing device in accordance with the motion of the user of the second information processing device detected in the second information processing device.

14. The information processing system according to claim 12, wherein in the linked operation mode, when a predetermined termination trigger motion for terminating the linked operation mode is detected in at least one of the first information processing device or the second information processing device, each of the first information processing device and the second information processing device is operated in a single operation mode, and the single operation mode is an operation mode for operating the first information processing device in accordance with the motion of the user of the first information processing device detected in the first information processing device, and also operating the second information processing device in accordance with the motion of the user of the second information processing device detected in the second information processing device.

* * * * *